US007768050B2

(12) United States Patent
Rappe et al.

(10) Patent No.: US 7,768,050 B2
(45) Date of Patent: Aug. 3, 2010

(54) FERROELECTRIC THIN FILMS

(75) Inventors: Andrew Marshall Rappe, Penn Valley, PA (US); Na Sai, Austin, TX (US); Alexie Michelle Kolpak, New Haven, CT (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 298 days.

(21) Appl. No.: 11/774,793

(22) Filed: Jul. 9, 2007

(65) Prior Publication Data

US 2008/0062615 A1 Mar. 13, 2008

Related U.S. Application Data

(60) Provisional application No. 60/819,080, filed on Jul. 7, 2006.

(51) Int. Cl.
H01L 29/76 (2006.01)
H01L 29/94 (2006.01)
H01L 21/00 (2006.01)

(52) U.S. Cl. .............................. 257/295; 257/E27.104; 257/E29.164; 257/E21.208; 257/E21.663; 438/3

(58) Field of Classification Search .................... 438/3; 257/295, E27.104, E29.164, E21.208, E21.663
See application file for complete search history.

(56) References Cited

U.S. PATENT DOCUMENTS

| 5,343,353 A | 8/1994 | Miki et al. ................... 361/322 |
| 5,479,317 A | 12/1995 | Ramesh ................... 361/321.5 |
| 5,645,976 A | 7/1997 | Azuma ....................... 430/313 |
| 5,717,157 A | 2/1998 | Tomozawa et al. ....... 136/236.1 |
| 5,822,175 A | 10/1998 | Azuma ................... 361/321.5 |
| 6,097,051 A | 8/2000 | Torii et al. ................... 257/306 |
| 6,326,671 B1 | 12/2001 | Nagano et al. .............. 257/486 |
| 6,380,574 B1 | 4/2002 | Torii et al. ................... 257/295 |
| 6,747,529 B2 | 6/2004 | Abe et al. .................... 333/188 |
| 6,958,504 B2 | 10/2005 | Nakagawa et al. .......... 257/295 |
| 7,026,693 B2 * | 4/2006 | Shimizu et al. ............. 257/410 |
| 2002/0000600 A1 | 1/2002 | Nagano et al. .............. 257/310 |

(Continued)

FOREIGN PATENT DOCUMENTS

EP 1 439 546 A1 7/2004

(Continued)

OTHER PUBLICATIONS

Bligaard, T., et al., "The Bronsted-Evans-Polanyi relation and the volcano curve in heterogeneous catalysis," J. of Catalysis, 2004, 224, 206-217.

(Continued)

*Primary Examiner*—Hsien-ming Lee
(74) *Attorney, Agent, or Firm*—Woodcock Washburn, LLP

(57) ABSTRACT

Ferroelectric structures and methods of making the structures are presented. The ferroelectric structures can include an electrode in contact with a ferroelectric thin film. The contact can be arranged so that a portion of the atoms of the ferroelectric thin film are in contact with at least a portion of the atoms of the electrode. The electrode can be made of metal, a metal alloy, or a semiconducting material. A second electrode can be used and placed in contact with the ferroelectric thin film. Methods of making and using the ferroelectric structures are also presented.

20 Claims, 8 Drawing Sheets

U.S. PATENT DOCUMENTS

2002/0053522 A1   5/2002   Cumings et al. ............ 205/640

FOREIGN PATENT DOCUMENTS

| | | | |
|---|---|---|---|
| JP | 4 181766 | A | 6/1992 |
| JP | 9 82902 | A | 3/1997 |
| WO | WO 02/102241 | A3 | 12/2002 |

OTHER PUBLICATIONS

Dawber, M., et al., "Physics of thin-film ferroelectric oxides," Rev. of Modern Physics, 2005, 77, 1083-1130.

Doyle, A.M., et al., "Hydrogenation on metal surfaces: Why are nanoparticles more active than single crystals?" Angew. Chem. Int. Ed., 2003, 42, 5240-5243.

Gomes, J.R.B., et al., "Interaction of Pd with $\alpha$-$Al_2O_3$(0001): A case study of modeling the metal-oxide interface on complex substrates," Physical Rev. B, 2002, 125414-1-12514-9.

Grinberg, I., et al., "Nonmonotonic $T_c$ trends in bi-based ferroelectric perovskite solid solutions," Physical Rev. Letts., 2007, 037603-1-037603-4.

Grinberg, I., et al., "Structure and polarization in the high $T_c$ ferroelectric Bi(Zn, Ti) $O_3$-$PbTiO_3$ solid solutions," Physical Rev. Letts., 2007, 107601-1-107601-4.

Haruta, M., "Size- and support-dependency in the catalysis of gold," Catalysis Today, 1997, 36, 153-166.

Heiz, U., et al., "Fundamental aspects of catalysis on supported metal clusters," J. of Mat. Chem., 2004, 14, 564-577.

Ichikawa, S., et al., "Electron holographic 3-D nano-analysis of Au/Ti02 catalyst at interface," J. of Electron Microscopy, 2003, 52, 21-26.

Inoue, Y., et al., "Use of LiNbO(3) for design of device-type catalysts with activity controllable functions," Catalysis Today, 1993, 16, 487-494.

Kato, Y., et al., "0.18-µm nondestructive readout FeRAM using charge compensation technique," IEEE Trans. On Electron Devices, 2005, 52(12), 2616-2621.

Kolpak, A.M., et al., "Short-circuit boundary conditions in ferroelectric $PbTiO_3$ thin films," arXiv:cond-mat/0512670v2, 2006, 1-5.

Molina, L.M., et al., "Active role of oxide support during CO oxidation at Au/MgO," Physical Rev. Letts., 2003, 90, 206102-1-206102-4.

Norskov, J.K., et al., "Universality in heterogeneous catalysis," J. of Catalysis, 2002, 209, 275-278.

Okumura, K., et al., "Durable and, selective activity of Pd loaded on WO3/ZrO2 for NO-CH4-O-2 in the presence of water vapor," Applied Catalysis B-Environmental, 2003_41, 137-142.

Park, C., et al., "Induction of an electronic perturbation in supported metal catalysts," J. of Physical Chem. B, 2000, 104, 4418-4424.

Park, C., et al., "Modifications in the catalytic properties of nickel supported on different dielectric oxides," Chem. Materials, 2002, 14, 273-280.

Sai, N., et al., "Ferroelectricity in ultrathin perovskite films," Phys. Rev. B, 2005, 72, 020101-1-020101-4.

Saito, N., et al., "Acoustic wave effects on catalysis, design of surfaces with artificially controllable functions for chemical reactions," applied Surface science, 2001, 169, 259-263.

Saito, N., et al., "Effects of acoustic waves generated on a positively polarized lead strontium zirconium titanate substrate upon catalytic activity of deposited Ag," Solid State Ionics, 2000, 136, 819-823.

Shaw, T.M., et al., "The properties of ferroelectric films at small dimensions," Annu. Rev. Mater.Sci., 2000, 30, 263-298.

Valden, M., et al., "Onset of catalytic activity of gold clusters on titania with the appearance of monmetallic properties," Science, 1998, 281, 1647-1650.

\* cited by examiner

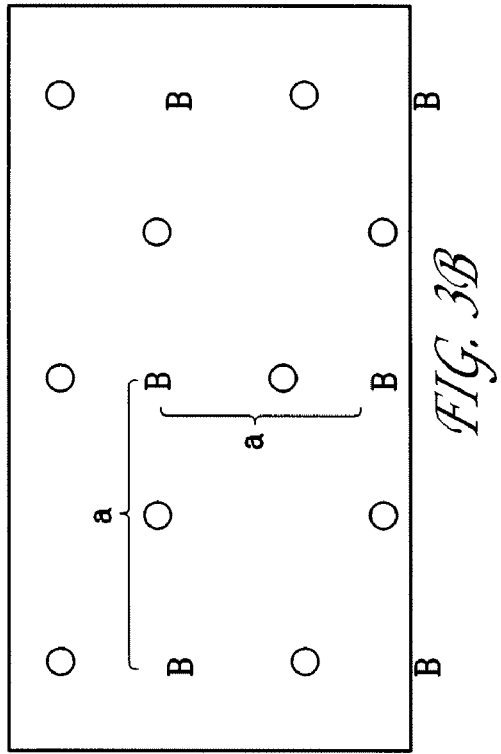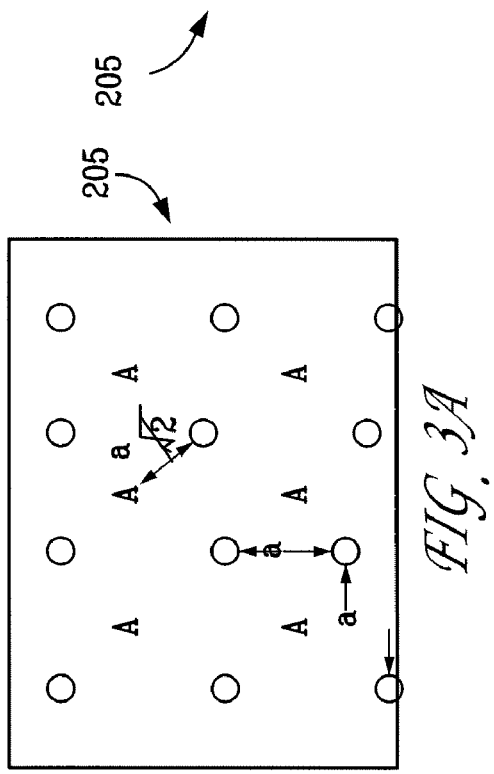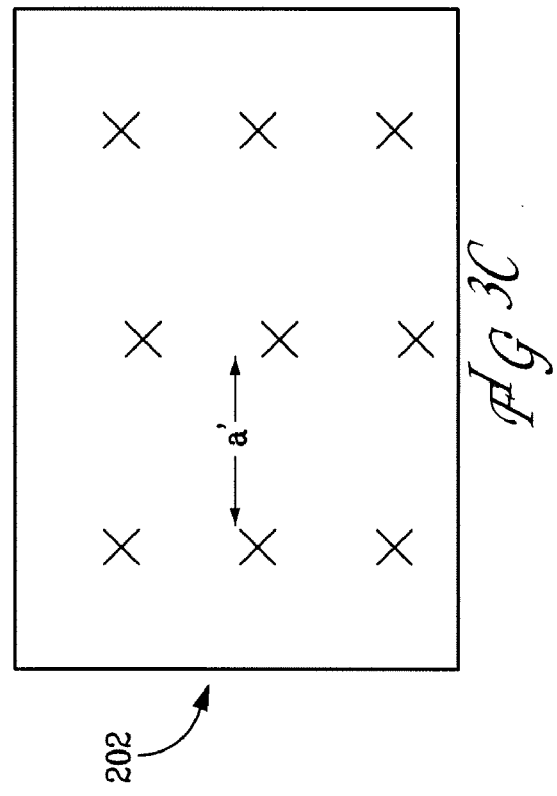
FIG. 3B
FIG. 3A
FIG. 3C

Pt/PbTiO₃

SrRuO₃/PbTiO₃

FERROELECTRIC THIN FILMS

CROSS REFERENCE TO RELATED APPLICATIONS

This application claims the benefit of U.S. Provisional Application Ser. No. 60/819,080, filed Jul. 7, 2006, the entirety of which is incorporated by reference herein.

STATEMENT OF GOVERNMENT INTEREST

The invention was made with U.S. Government support. The Government may have certain rights in the invention under Office of Naval Research Grant Nos. N00014-00-1-0372 and N00014-01-1-0365 and NSF MRSEC Program Grant No. DMR00-79909.

FIELD OF THE INVENTION

The field relates to thin film ferroelectric nanostructures, methods of making such structures, and devices containing the same.

BACKGROUND OF THE INVENTION

Ferroelectric materials contain permanent electric dipoles which can be aligned in order to store a permanent electric polarization within the material. Devices made with ferroelectric materials can be used as memory elements, transducers, and resonators. It is desirable to make devices smaller, for instance by utilizing thin films. However, ferroelectricity in thin films is affected by size. It was thought that there was a critical size below which stable ferroelectric behavior could not be maintained in thin films. For example, researchers have found that $BaTiO_3$ films with $SrRuO_3$ electrodes do not possess ferroelectricity where the ferroelectric film is less than 24 Angstroms thick, and further state that ferroelectricity will be suppressed relative to bulk for films between 24 and 150 Angstroms thick (J. Junquera and P. Ghosez, Nature (London) 422, 506 (2003)). As a result, devices using thin films were thought to have a lower size limit, below which useful ferroelectric structures could not be made. This lower limit on the size of useful ferroelectric structures creates a limit on the size of devices and systems incorporating such structures, such as data storage systems. Accordingly, it is desirable to be able to overcome this perceived lower limit to create even thinner ferroelectric structures.

An additional consideration is that ferroelectric thin films are known to experience fatigue, meaning that after some number of switching cycles the polarization of the film can no longer be switched. Therefore, while it is desirable to be able to overcome the perceived lower thickness limit of useful ferroelectric structures, it is also desirable to inhibit fatigue in such structures and to provide high polarization.

SUMMARY OF THE INVENTION

The present invention provides ferroelectric structures comprising a first electrode. The first electrode comprises a first layer having a periodic atomic arrangement. The ferroelectric structure further comprises a ferroelectric thin film comprising a first termination and a second termination. At least a portion of the first layer of the first electrode is in contact with at least a portion of the first termination of the ferroelectric thin film. The first termination of the ferroelectric thin film has a periodic atomic arrangement that approximately matches the periodic atomic arrangement of the first layer of the first electrode.

The present invention also provides ferroelectric structures comprising a first electrode comprising a first layer having a periodic atomic arrangement. The ferroelectric structure further comprises a ferroelectric thin film comprising a first termination and a second termination. At least a portion of the first layer of the first electrode is in epitaxial contact with at least a portion of the first termination of the ferroelectric thin film. The first termination of the ferroelectric thin film has a periodic atomic arrangement that approximately matches the periodic atomic arrangement of the first layer of the first electrode.

The present invention also provides ferroelectric structures comprising a first electrode comprising a first surface. The first surface has a periodic arrangement of atoms of the first electrode. The ferroelectric structure further comprises a ferroelectric thin film comprising a first termination and a second termination. The first termination is formed of a periodic arrangement of at least one type of atom of the ferroelectric thin film. At least a portion of the periodic arrangement of atoms of the first surface of the first electrode is in epitaxial contact with at least a portion of the periodic arrangement of atoms of the first termination of the ferroelectric thin film.

The present invention also provides methods of forming a ferroelectric structure. The method comprises forming a ferroelectric thin film comprising a first termination and a second termination. The first termination has a periodic arrangement of atoms of the ferroelectric thin film. The method further comprises forming a first electrode comprising a first surface having a periodic arrangement of atoms of the first electrode. At least a portion of the periodic arrangement of atoms of the first surface of the first electrode is formed in epitaxial contact with at least a portion of the periodic arrangement of atoms of the first termination of the ferroelectric thin film.

The present invention also provides methods of increasing polarization of a ferroelectric material above a bulk value. The method comprises providing a ferroelectric material having a bulk polarization value, and forming a ferroelectric thin film of the ferroelectric material, the ferroelectric thin film having a first termination and a second termination. The method further comprises providing a first electrode having a first surface, and providing a second electrode having a first surface. The method further comprises placing the first surface of the first electrode in epitaxial contact with the first termination, and placing the first surface of the second electrode in epitaxial contact with the second termination.

The present invention also provides ferroelectric structures. The ferroelectric structure comprises a first electrode comprising a first layer having a periodic atomic arrangement. The ferroelectric structure further comprises a ferroelectric thin film comprising a first termination and a second termination. The ferroelectric structure further comprises a second electrode comprising a first layer having a periodic atomic arrangement. At least a portion of the first layer of the first electrode is in contact with at least a portion of the first termination of the ferroelectric thin film. At least a portion of the first layer of the second electrode is in contact with at least a portion of the second termination of the ferroelectric thin film. The first termination of the ferroelectric thin film has a periodic atomic arrangement that approximately matches the periodic atomic arrangement of the first layer of the first electrode. The second termination of the ferroelectric thin film has a periodic atomic arrangement that approximately matches the periodic atomic arrangement of the first layer of the second electrode. The first electrode and second electrode comprise metal, a metal alloy, a semiconductor, or a combination thereof.

BRIEF DESCRIPTION OF THE DRAWINGS

FIGS. 3A and 3B illustrate two examples of a top view of a first termination of the ferroelectric structure of FIG. 2 according to an example of the present invention;

FIG. 3C illustrates a top view of a first layer of an electrode of the ferroelectric structure of FIG. 2 according to an example of the present invention;

DETAILED DESCRIPTION OF ILLUSTRATIVE EMBODIMENTS

Terms

Figure 1:
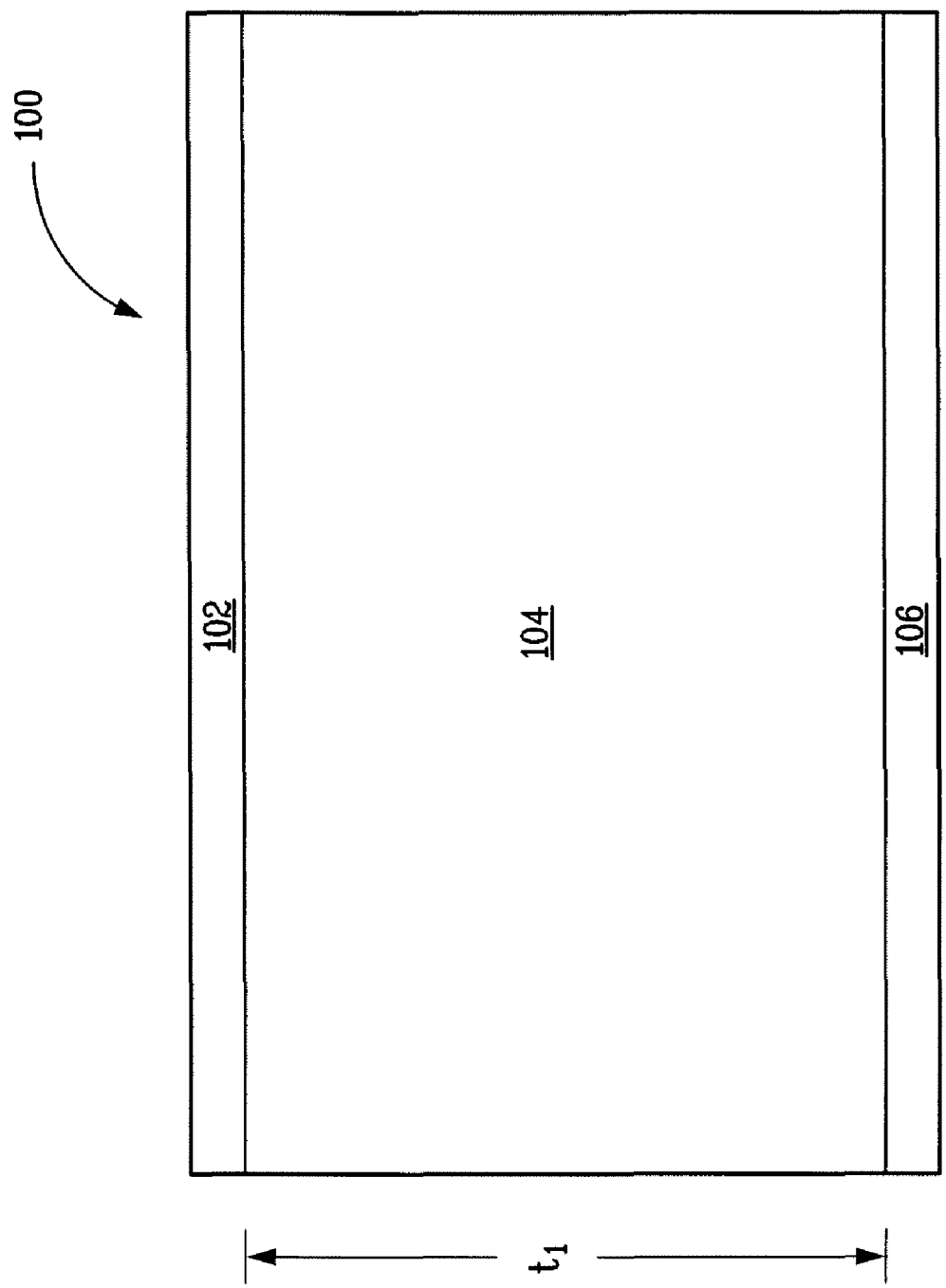
FIG. 1 illustrates a ferroelectric structure according to one embodiment of the present invention.

As used herein, the term "perovskite" means a structure with an empirical formula given by $ABO_3$, where A is a cation, a combination of cations, or a combination of cations and vacancies, B is a cation, a combination of cations, or a combination of cations and vacancies, and O is Oxygen.

As used herein, the term "epitaxial" means the growth on a crystalline substrate of a crystalline substance that copies the crystalline orientation of the crystalline substrate. The terms "lattice-matching," "registration," and "epitaxy," are used synonymously herein unless otherwise indicated.

As used herein, the term "FERAM" means a ferroelectric random access memory.

The present invention provides ferroelectric structures. Suitable ferroelectric structures comprise a first electrode comprising a first layer having a periodic atomic arrangement. Suitable ferroelectric structures further comprise a ferroelectric thin film comprising a first termination and a second termination. At least a portion of the first layer of the first electrode is in contact with at least a portion of the first termination of the ferroelectric thin film. The first termination of the ferroelectric thin film has a periodic atomic arrangement that approximately matches the periodic atomic arrangement of the first layer of the first electrode.

The ferroelectric structures can further comprise a second electrode comprising a first layer having a periodic atomic arrangement. At least a portion of the first layer of the second electrode is in contact with at least a portion of the second termination of the ferroelectric thin film. The second termination of the ferroelectric thin film has a periodic atomic arrangement that approximately matches the periodic atomic arrangement of the first layer of the second electrode. The first electrode and second electrode can comprise metal or a metal alloy. A suitable metal or metal alloy comprises platinum. Suitable ferroelectric films have a thickness in the range of from about 5 Angstroms to about 50 nanometers, and can be as thin as approximately 4 Angstroms. Suitable ferroelectric thin films can further comprise a repeated pattern of layers of PbO and $TiO_2$. Suitable ferroelectric thin films can comprise a perovskite thin film.

The first termination can comprise PbO and the like. The second termination can comprise PbO and the like. The first termination can comprise $TiO_2$ and the like. The second termination can comprise $TiO_2$ and the like. The first and second terminations of the ferroelectric thin film can have a (100) crystallographic orientation. The first electrode can have a (100) crystallographic orientation. The second electrode can have a (100) crystallographic structure. A charge storage device can be provided comprising the described ferroelectric structure. A FERAM device can be provided comprising the ferroelectric structure.

The present invention also provides ferroelectric structures. Suitable ferroelectric structures comprises a first electrode comprising a first layer having a periodic atomic arrangement. Suitable ferroelectric structures can further comprise a ferroelectric thin film comprising a first termination and a second termination. At least a portion of the first layer of the first electrode is in epitaxial contact with at least a portion of the first termination of the ferroelectric thin film. The first termination of the ferroelectric thin films has a periodic atomic arrangement that approximately matches the periodic atomic arrangement of the first layer of the first electrode.

The ferroelectric structure can further comprise a second electrode comprising a first layer having a periodic atomic arrangement. At least a portion of the first layer of the second electrode is in contact with at least a portion of the second termination of the ferroelectric thin film. The second termination of the ferroelectric thin film has a periodic atomic arrangement that approximately matches the periodic atomic arrangement of the first layer of the second electrode. The first electrode and second electrode can comprise metal or a metal alloy. The first electrode and the second electrode can comprise platinum. The ferroelectric thin film can have a thickness in the range of from about 5 Angstroms to about 50 nanometers, and can be as thin as approximately 4 Angstroms. The ferroelectric thin film can further comprise a repeated pattern of layers of PbO and $TiO_2$. The ferroelectric thin film can be a perovskite thin film.

The first termination can comprise PbO. The second termination can comprise PbO. The first termination can comprise $TiO_2$. The second termination can comprise $TiO_2$. The first and second terminations of the ferroelectric thin film can have a (100) crystallographic orientation. The first electrode can have a (100) crystallographic orientation. The second electrode can have a (100) crystallographic structure. Charge storage devices can be provided comprising any one or more of the ferroelectric structures described herein. FERAM devices can be provided comprising one or more of the ferroelectric structures described herein.

The present invention also provides ferroelectric structures comprising a first electrode comprising a first surface. The first surface has a periodic arrangement of atoms of the first electrode. The ferroelectric structure further comprises a ferroelectric thin film comprising a first termination and a second termination. The first termination is formed of a periodic arrangement of at least one type of atom of the ferroelectric thin film. At least a portion of the periodic arrangement of atoms of the first surface of the first electrode is in epitaxial contact with at least a portion of the periodic arrangement of atoms of the first termination of the ferroelectric thin film.

Suitable ferroelectric structures can further comprise a second electrode comprising a first surface, the first surface having a periodic arrangement of atoms of the second electrode. The second termination can be formed of a periodic arrangement of at least one type of atom of the ferroelectric thin film. At least a portion of the periodic arrangement of atoms of the first surface of the second electrode can be in epitaxial contact with at least a portion of the periodic arrangement of atoms of the second termination of the ferroelectric thin film. The first electrode and second electrode can comprise metal or a metal alloy. The first electrode and the second electrode can comprise platinum. The ferroelectric thin film can have a thickness in the range of from about 5 Angstroms to about 50 nanometers, and can be as thin as approximately 4 Angstroms. The ferroelectric thin film can further comprise a repeated pattern of layers of PbO and $TiO_2$. The ferroelectric thin film can be a perovskite thin film.

The first termination can comprise PbO. The second termination can comprise PbO. The first termination can comprise $TiO_2$. The second termination can comprise $TiO_2$. The first and second terminations of the ferroelectric thin film can have a (100) crystallographic orientation. The first electrode can have a (100) crystallographic orientation. The second electrode can have a (100) crystallographic structure. Charge storage devices can be provided comprising one or more of any of the ferroelectric structures described herein. FERAM devices comprising one or more of the ferroelectric structures can also be provided according to the description provided herein.

The present invention also provides methods of forming a ferroelectric structure. These methods comprise forming a ferroelectric thin film comprising a first termination and a second termination. The first termination has a periodic arrangement of atoms of the ferroelectric thin film. These methods further comprise forming a first electrode comprising a first surface having a periodic arrangement of atoms of the first electrode. At least a portion of the periodic arrangement of atoms of the first surface of the first electrode is formed in epitaxial contact with at least a portion of the periodic arrangement of atoms of the first termination of the ferroelectric thin film.

The methods of forming a ferroelectric structure can further comprise forming a second electrode comprising a first surface having a periodic arrangement of atoms of the first electrode. The second termination has an arrangement of atoms of the ferroelectric thin film. At least a portion of the periodic arrangement of atoms of the first surface of the second electrode can be formed in epitaxial contact with at least a portion of the periodic arrangement of atoms of the second termination of the ferroelectric thin film. The methods can comprise forming the first electrode of a metal or metal alloy. The methods can comprise forming the first electrode of platinum. The methods can further comprise forming the second electrode of a metal of a metal alloy. The methods can comprise forming the second electrode of platinum. Forming the ferroelectric thin film can comprise forming a perovskite thin film.

The present invention also provides methods of increasing polarization of a ferroelectric material above a bulk value. These methods comprise providing a ferroelectric material having a bulk polarization value. These methods further comprise forming a ferroelectric thin film of the ferroelectric material, the ferroelectric thin film having a first termination and a second termination. The methods further comprise providing a first electrode having a first surface, and providing a second electrode having a first surface. The methods further comprises placing the first surface of the first electrode in epitaxial contact with the first termination, and placing the first surface of the second electrode in epitaxial contact with the second termination.

The present invention also provides ferroelectric structures. The ferroelectric structures comprise a first electrode comprising a first layer having a periodic atomic arrangement. The ferroelectric structures further comprise a ferroelectric thin film comprising a first termination and a second termination. The ferroelectric structures further comprise a second electrode comprising a first layer having a periodic atomic arrangement. At least a portion of the first layer of the first electrode is in contact with at least a portion of the first termination of the ferroelectric thin film. At least a portion of the first layer of the second electrode is in contact with at least a portion of the second termination of the ferroelectric thin film. The first termination of the ferroelectric thin film has a periodic atomic arrangement that approximately matches the periodic atomic arrangement of the first layer of the first electrode. The second termination of the ferroelectric thin films has a periodic atomic arrangement that approximately matches the periodic atomic arrangement of the first layer of the second electrode. The first electrode and second electrode suitably comprise metal, a metal alloy, a semiconductor, or a combination thereof. A transducer can be provided comprising the ferroelectric structure.

Ferroelectric structures are utilized to create useful nanostructures and devices. FIG. 1 illustrates an example of a ferroelectric structure. In FIG. 1, a ferroelectric structure 100 comprises a first electrode 102, a ferroelectric thin film 104, and a second electrode 106. As will be discussed in greater detail in what follows, the first electrode 102 and the second electrode 106 can each comprise one or more layers of atoms. The first electrode 102 can have a first layer having a periodic atomic arrangement. As will be discussed in greater detail, at least a portion of the first layer of the first electrode 102 can be in contact with the ferroelectric thin film 104. For example, the first electrode 102 can be in epitaxial contact with the thin ferroelectric thin film 104. Similarly, the second electrode 106 can have a first layer having a periodic atomic arrangement, and at least a portion of the first layer of the second electrode 106 can be in contact with the ferroelectric thin film 104. For example, the second electrode 106 can be in epitaxial contact with the thin ferroelectric thin film 104. The first electrode 102 can be epitaxially formed on the thin ferroelectric thin film 104 such that a (100) crystallographic plane of the first electrode is in epitaxial contact with a (100) crystallographic plane of the ferroelectric thin film 104. The second electrode 106 can be epitaxially formed on the ferroelectric thin film 104 such that a (100) crystallographic plane of the second electrode is in epitaxial contact with a (100) crystallographic plane of the thin ferroelectric thin film 104.

Ferroelectric structures 100 can be formed of various materials. For example, the first electrode 102, and the second electrode 106 can be made of a metal, metal alloy, semiconductor, or a combination thereof. One layer of the first electrode can be made of one material while additional layers of the electrode can be made from different materials. For instance, the first electrode 102 and the second electrode 106 can comprise platinum, or a platinum alloy. The first electrode 102, the second electrode 106, or both, can comprise a semiconducting material. The particular material used to form first electrode 102 and second electrode 106 can be chosen to match a specific operating characteristic or device, for instance by choosing a material with a desired conductivity and an appropriate average lattice parameter to approximately match an average lattice parameter of the ferroelectric thin film 104. The ferroelectric thin film 104 can comprise a perovskite film, a layer perovskite, a Ruddleston-Popper phase, or other appropriate ferroelectric film. The ferroelectric thin film 104 can have a thickness of 4 Angstroms or greater. In some situations the conventional lattice parameters can have specified rational or irrational ratios in order to achieve atomic matching. For example, the conventional lattice parameter of Si is 5.43 Angstroms, meaning that a single (100) plane contains Si atoms that form a square lattice with a repeat distance given by 5.43/sqrt(2)=3.84 Angstroms. If Si were used as an electrode in a ferroelectric structure 100, the 3.84 Angstrom distance is what can match the conventional lattice parameter of a perovskite thin film. In this example, the materials used for the ferroelectric thin film and the electrode can be chosen such that the repeat distance of Si, $a_{Si}$, and the repeat distance of the ferroelectric, $a_{FE}$, are described by the relationship $a_{Si}/a_{FE}$=sqrt(2).

Figure 2:
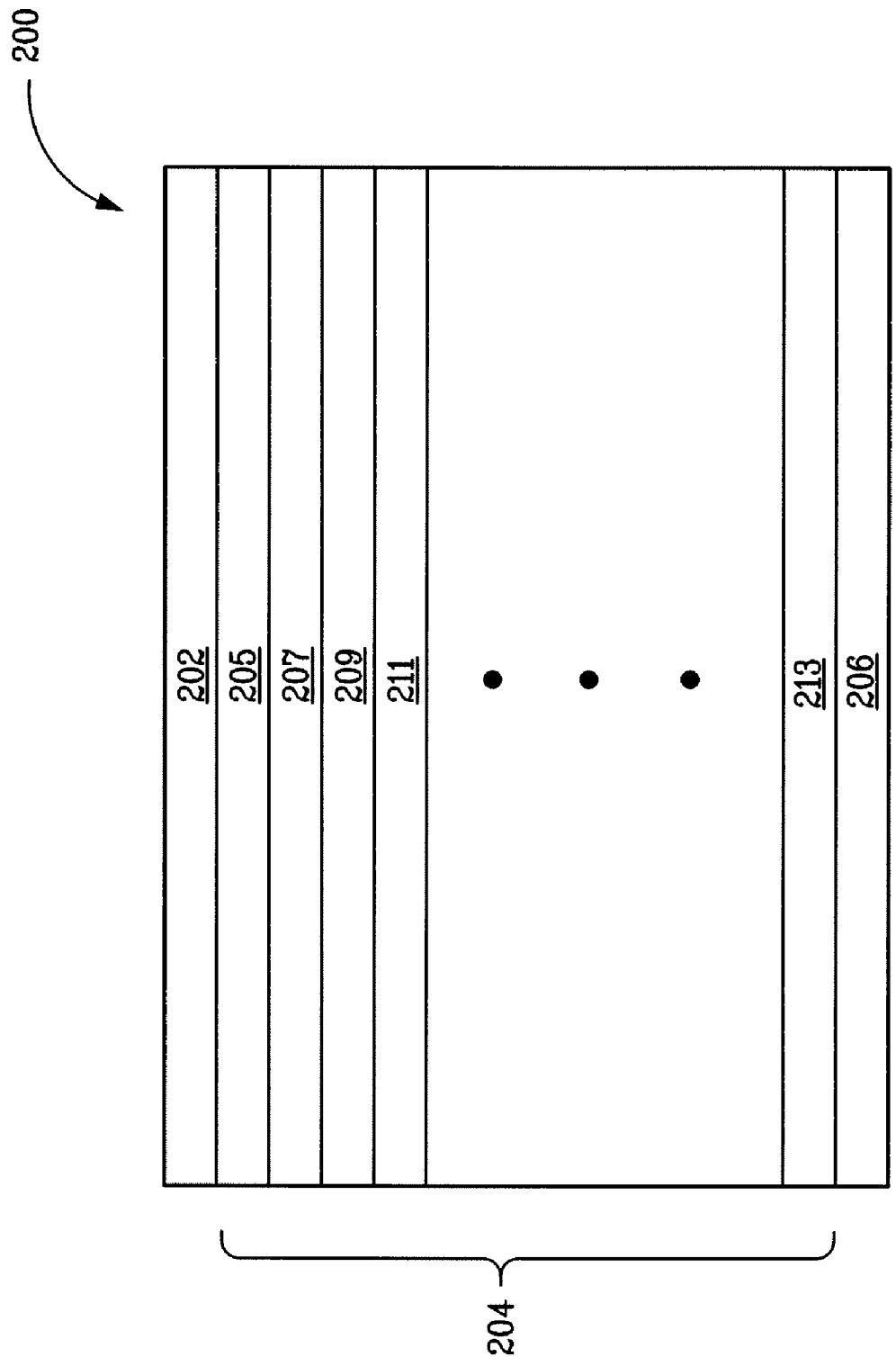
FIG. 2 illustrates a detailed example of the ferroelectric structure of FIG. 1.

FIG. 2 illustrates an example of a ferroelectric structure 200 similar to ferroelectric structure 100 in FIG. 1. The ferroelectric structure 200 comprises a first electrode 202, an ferroelectric thin film 204, and a second electrode 206. The ferroelectric thin film 204 comprises multiple layers 205, 207, 209, 211, etc. The ferroelectric thin film 204 can comprise any number of layers, as indicated by the dots in FIG. 2. The layers 205 and 213, which terminate the ferroelectric thin film, are referred to as terminations. Specifically, the layer 205 can be referred to as a first termination of the ferroelectric thin film 204. The layer 213 can be referred to as a second termination of the ferroelectric thin film 204. The terminations 205 and 213, as with all the layers of the ferroelectric thin film 204, can have a periodic atomic arrangement. It is not necessary for the first termination and the second termination, or any other layers of the ferroelectric thin film, to have the same period atomic arrangement. The atoms constituting the period atomic arrangement of a layer or a termination need not be entirely planar, as atoms could be off-plane by up to 1 Angstrom. The first electrode 202 and second electrode 206 can each comprise one or more layers of atoms.

FIGS. 3A-3B represent two examples of top views of the first termination 205. As mentioned, the first termination 205 can have a periodic atomic arrangement. For instance, if the first termination comprises a layer of periodically arranged atoms with empirical formula AO, the periodic atomic arrangement would appear as shown in FIG. 3A for a (100) crystallographic orientation of the termination. The distance between adjacent 0 atoms is given by a. The distance between an O atom and an adjacent A atom is given by a/sqrt(2). It will be understood that the A atoms and the O atoms are not necessarily completely planar. FIG. 3B shows an example of the periodic atomic arrangement of termination 205 if the termination 205 comprises a layer of periodically arranged atoms with empirical formula $BO_2$ in its (100) crystallographic orientation. As shown in FIG. 3B, the distance between adjacent B atoms is given by a. It will be apparent to those of skill in the art that the representative periodic atomic arrangements illustrated in FIGS. 3A and 3B would be different if the termination 205 comprised a different atomic composition, or if a crystallographic orientation other than a (100) crystallographic orientation were used. Also, it will be appreciated that in practice slight differences can arise from those periodic atomic arrangements shown, such as if dislocations occur, or if dopants are used. It will also be appreciated that termination 213 can show a similar periodic atomic arrangement to that shown for termination 205.

FIG. 3C illustrates a top view of first electrode 202. The first electrode can comprise a metal, a metal alloy, or a semiconducting material with X atoms. The X atoms can be periodically disposed within a plane, or nearly planar, and can be spaced by a distance a', which can or can not be the same as the distance a in FIGS. 3A and 3B. The distance a' will depend on the type of atoms X chosen, and whether or not the first electrode 202 comprises a pure metal, an alloy, or a semiconducting material. It should also be understood that each mark "X" could represent the same atom, different atoms, multiple atoms, or combinations of atoms and vacancies.

The ferroelectric structure 200 is formed such that at least a portion of the first layer of the first electrode 205, as shown in FIG. 3C, is in contact with at least a portion of the first termination of the ferroelectric thin film 204 as shown in either FIG. 3A or FIG. 3B. It is not necessary that every atom of the first layer of the first electrode be in contact with an atom of the first termination 205. Whether or not an atom of the first layer of the first electrode is in contact with an atom of the first termination will depend on the atomic composition of the first layer of the first electrode as well as the atomic composition of the first termination 205. Similarly, the ferroelectric structure 200 can be formed such that at least a portion of the first layer of the second electrode 206 is in contact with at least a portion of the second termination of the ferroelectric film 204. It should be appreciated that if the first electrode or the second electrode comprise more than one layer of atoms, it is not necessary for the atoms of the layers other than the first layer to be disposed in a periodic or crystalline pattern.

A specific example of an embodiment of the ferroelectric structure 200 is provided hereinbelow. According to this example, the ferroelectric thin film 204 can comprise a perovskite thin film, such as $PbTiO_3$, PZT, $Pb(Zr_{(1-x)}Ti_x)O_3$ for $0 \leq x \leq 1$, or any other perovskite thin film. The first termination 205 and second termination 213 can be AO (A=Pb) or $TiO_2$ ferroelectric terminations. The choice of which termination to use can depend on what electrodes, if any, will be in contact with the terminations. According to this example, the first electrode 202 and the second electrode 206 are made of platinum, and each comprise at least one layer of platinum atoms. Use of Pt as the first electrode 202 provides a stable ferroelectric structure. If the first electrode 202 comprises four layers of platinum atoms, and the second electrode 206 comprises five layers of platinum atoms, then a periodically repeated supercell can thus be described by the general formula $Pt_4/AO—(TiO_2—AO)m/Pt_5$ and $Pt_4/TiO_2-(AO—TiO_2)$ $m/Pt_5$. If $SrRuO_3$ were substituted in place of Pt as the electrode material, then the periodically repeated supercell could be described by the general formula $(SrO—RuO_2)_2/AO—(TiO_2-AO)m/(RuO_2—SrO)_2—RuO_2$ and $(RuO_2—SrO)_2/TiO_2-(AO—TiO_2)m/(SrO—RuO_2)_2—SrO$. If $PbTiO_3$ is used as the ferroelectric thin film, then the first termination and the second termination will have a lattice parameter of a=3.905 Angstroms, corresponding to either a in FIG. 3A or a in FIG. 3B. If platinum is used as the material for the first electrode 202, then the first layer of platinum will have a metal lattice parameter of a'=3.92 Angstroms. Accordingly, if the first termination 205 has a periodic atomic arrangement as illustrated in FIG. 3A, then the atoms of the first layer of the platinum electrode will contact all the atoms of the first termination. Alternatively, if the first termination 205 has a periodic atomic arrangement as illustrated in FIG. 3B, then the atoms of the first layer of the platinum electrode will contact, or can approximately register with, the O atoms of the first termination. In other words, so long as a is approximately equal to a', the registration between the layers can be sufficient. Similar behavior will be exhibited for the second termination and the second electrode 206. It should also be noted that ferroelectric structures 200 can be constructed so that a first electrode of one ferroelectric structure 200 can be in contact with a second electrode of another ferroelectric structure 200.

Ferroelectric structures 100 and 200 can be formed using any of a variety of thin film processing technologies known in the art. For example, a ferroelectric thin film 104 can be formed by any known method of forming thin films. The ferroelectric thin film can be formed with a thickness $t_1$ of about four (4) Angstroms or greater, as illustrated in FIG. 1. The first electrode 102 can be formed using pulsed laser deposition, molecular beam epitaxy, chemical vapor deposition, atomic layer deposition, wet chemical means, annealing of nonepitaxial or partially epitaxial interfaces, or any other means capable of producing a desired atomic arrangement of a first layer of the first electrode. The first electrode can be formed in its (100) crystallographic orientation or another crystallographic orientation. The second electrode 106 can be formed in its (100) crystallographic orientation using any of the aforementioned processes, or other known growth techniques. The second electrode can be formed in its (100) crystallographic orientation or another crystallographic orientation. It is possible that the first layer of the first electrode 102 can be formed using one technique in order to ensure lattice matching, or registration, with the ferroelectric thin film, and then other techniques can be used to add additional layers to the first electrode. Similarly, it is possible that the first layer of the second electrode 106 can be formed using one technique in order to ensure lattice matching, or registration, with the ferroelectric thin film, and then other techniques can be used to add additional layers to the second electrode.

Ferroelectric structures 100 can be used in a variety of ways. For example, ferroelectric structures such as that depicted in FIG. 1 can be used as a charge storage device, such as a capacitor. To do so, a first electrical signal is applied to the first electrode 102. The application of the first signal to the first electrode creates an electric field in the thin ferroelectric oxide film 104 which results in a stable ferroelectric phase of the thin ferroelectric oxide film 104. The resulting ferroelectric phase can be used to store information, for example, by representing a digital 0 or 1 (i.e., "on" or "off") state. The ferroelectric phase of the thin ferroelectric oxide film can be erased or switched by applying an appropriate signal or signals to the first and second electrodes 102 and 106. Control of the ferroelectric structure 100 in this manner utilizes the ferroelectric structure as a capacitor or a nanocapacitor, which can find use in devices such as a memory device. As used herein, the term "nanocapacitor" is a capacitor have a characteristic dimension smaller than about 100 nm (1,000 Angstroms). The ferroelectric structures disclosed herein can be used for FERAM applications. Such structures can be written to, and can be read destructively or non-destructively. FERAM materials can be highly robust against signal loss or degradation, and can endure $10^{12}$-$10^{16}$ cycles or more. Alternatively, the ferroelectric structures disclosed herein can be used as transducers. Ferroelectric thin films are responsive to strain signals, outputting an electrical signal when a strain is detected. Such behavior can be utilized to form useful transducers at small scale.

Figure 4A:
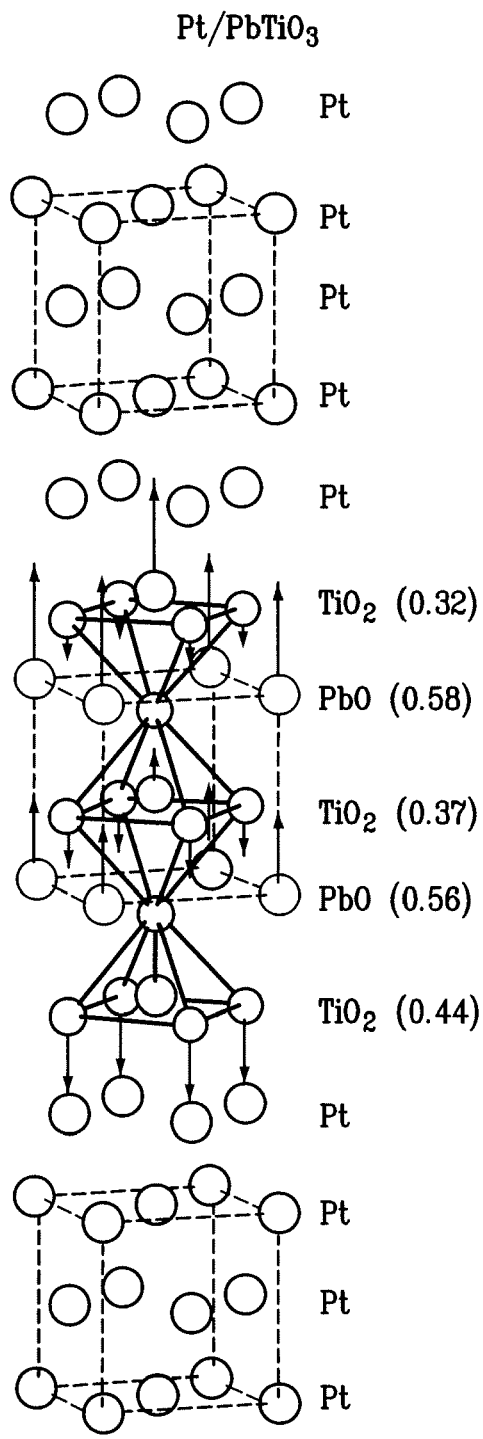
FIGS. 4A and 4B illustrate two examples of the atomic arrangement of a ferroelectric structure according to an embodiment of the present invention, and a plot of the electrostatic potential of a freestanding ferroelectric thin film.
Figure 4B:
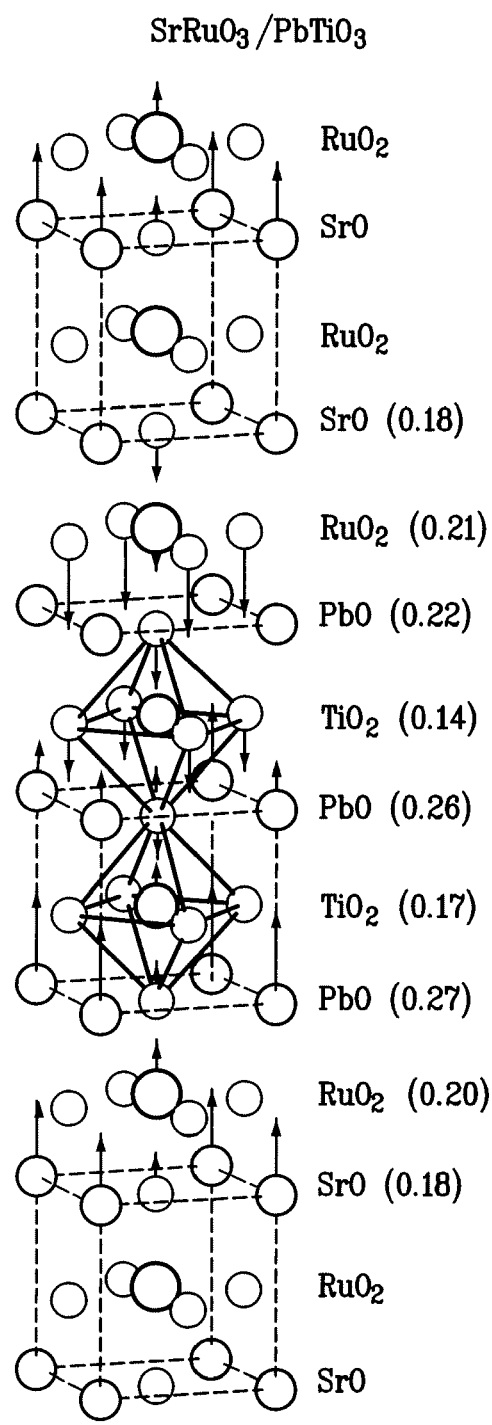

FIGS. 4A and 4B show examples of the structures for two representative ferroelectric structures 200 at m=2 according to simulations of the structures. The in-plane atomic positions of the nanostructures can be kept fixed at the ideal perovskite positions and the in-plane lattice constants can be about equivalent to the experimental value for the corresponding bulk ferroelectric perovskite, i.e., a=3.935 Å for $PbTiO_3$, and a=3.99 Å for $BaTiO_3$. FIG. 4A shows the relaxed supercell structure of the $TiO_2$-terminated $PbTiO_3$ film with Pt electrodes and m=2. Simulation calculations of the relative displacement between the cations and anions for each $PbTiO_3$ layer demonstrates that the structure is in a ferroelectric state. Table I shows the polarization P ($C/m^2$) and the tetragonality ratio c/a for structures utilizing various termination and electrode combinations, where c represents the length of the long axis of the structure (parallel to the polarization) and a represents the length of the two short axes of the structure. As Table I shows, $PbTiO_3$ films with Pt electrodes are ferroelectric for all thicknesses down to m=1. For both types of terminations shown, PbO and $TiO_2$, the polarization values in these systems are slightly larger than the corresponding bulk value.

TABLE I

| Termination | Electrode | m | P ($C/m^2$) | c/a |
|---|---|---|---|---|
| PbO | Pt | 1 | 0.89 | 1.109 |
| PbO | Pt | 2 | 1.00 | 1.140 |
| PbO | Pt | 4 | 0.88 | 1.058 |
| $TiO_2$ | Pt | 2 | 0.86 | 1.110 |
| $TiO_2$ | Pt | 4 | 0.85 | 1.055 |
| PbO | $SrRuO_3$ | 2 | 0.36 | 1.049 |
| $TiO_2$ | $SrRuO_3$ | 2 | 0.32 | 1.040 |
| | | bulk | 0.75 | 1.060 |

Referring to Table I, the listed results indicate that bulk ferroelectric polarization can be stabilized in thin films below 24 Angstroms, below 20 Angstroms, below 15 Angstroms, or even below 10 Angstroms with Pt or $SrRuO_3$ electrodes, and that polarizations greater than the bulk value can be obtained with the ferroelectric structures disclosed herein. As FIGS. 4A and 4B illustrate, an upward pointing polarization leads to an enhancement of the relative displacements at the bottom interface, and a reduction at the top interface, relative to the interior layers. This observation is in agreement with density functional theory (DFT) calculations with external fields. In going from m=2 to m=4, both P and c/a decrease towards the bulk values as the surface-to-volume ratio decreases and the surface effect is averaged over more layers. Table I shows that a single unit cell (m=1) has a stable polarization of 0.89 $C/m^2$. The simulations indicate the absence of a critical thickness for ferroelectricity in $PbTiO_3$ films with Pt electrodes.

Figure 5:
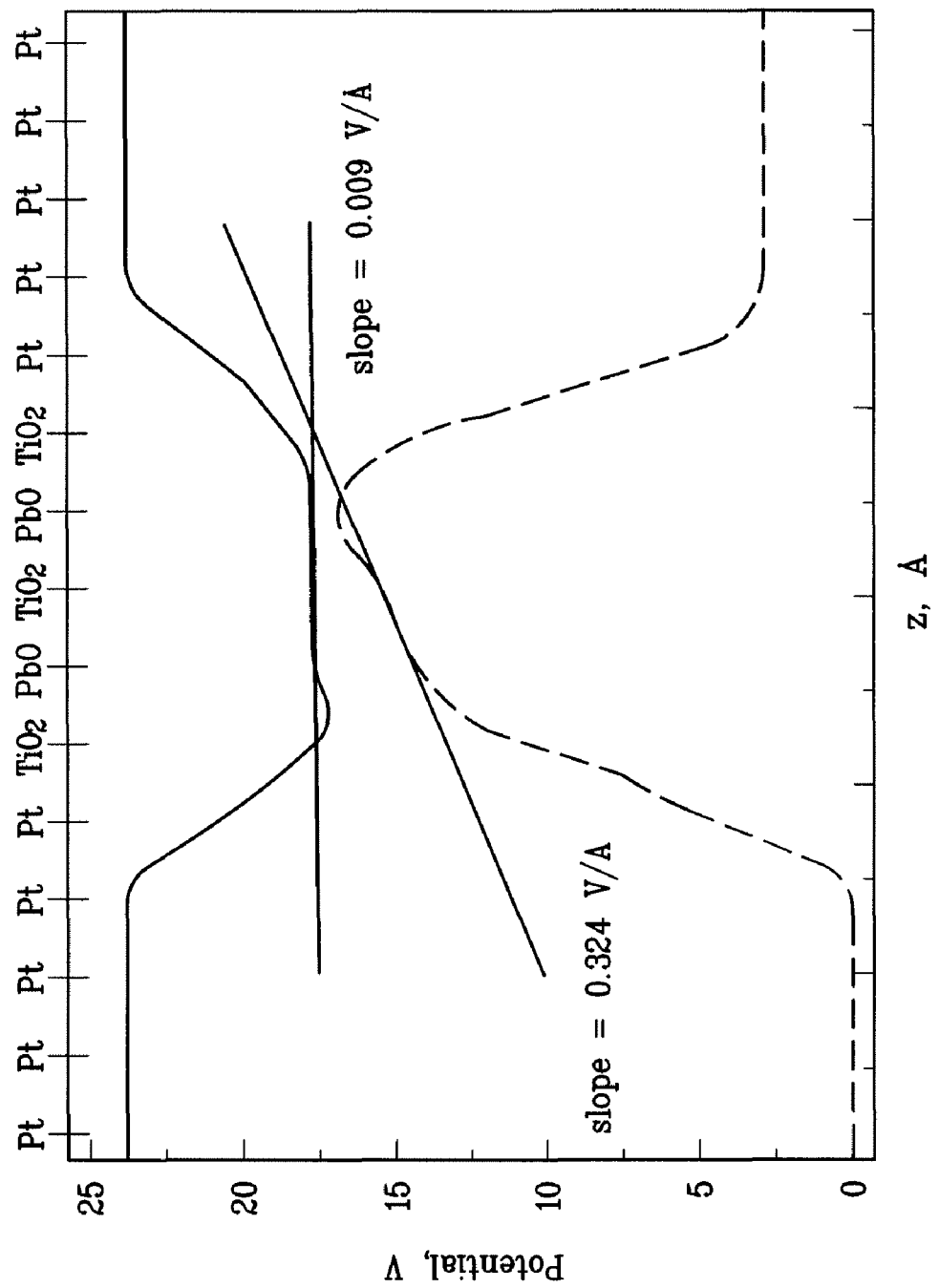
FIG. 5 is a plot of the layer averaged and windowed electrostatic potential within a ferroelectric structure according to an embodiment of the present invention.

FIG. 5 is a graphical plot of the electrostatic potential within a ferroelectric structure according to an embodiment of the present invention. Specifically, FIG. 5 illustrates the electric field in a Pt/$PbTiO_3$/Pt nanocapacitor by a plot of the macroscopic-averaged electrostatic potential (solid line) in the nanocapacitor. The nanocapacitor comprises platinum electrodes and a $PbTiO_3$ ferroelectric oxide film. Also shown in FIG. 5 is the macroscopic-averaged electrostatic potential in the freestanding (no electrodes) $PbTiO_3$ film (dotted line) in which a bulk ferroelectric displacement perpendicular to a surface of the film is imposed. The slope of the potential in the $PbTiO_3$ film, which is the depolarizing field, is significantly smaller in the capacitor (0.009 V/Å), than in the freestanding slab (0.324 V/Å). In the absence of electrodes, the latter field brings the system back to the paraelectric structure. Without being bound by a particular theory of operation, the cancellation of a substantial fraction (97%) of the depolarizing field is due to metallic screening from the grounded electrodes that compensates the polarization charge.

Figures 6A, 6B:
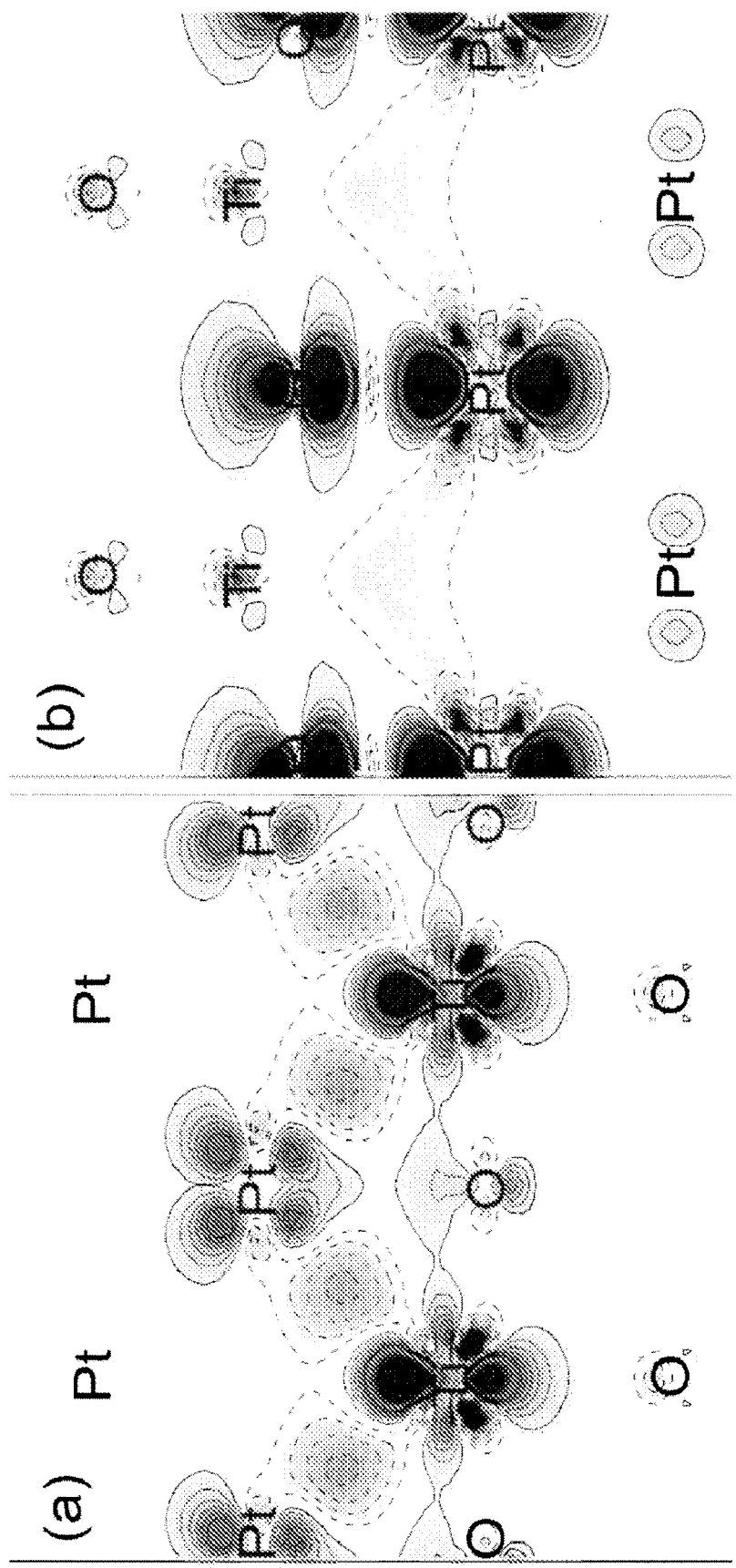
FIGS. 6A and 6B illustrate the charge effects at the ferroelectric-metal interfaces of a ferroelectric structure according to an embodiment of the present invention.

In addition, the screening of the electrodes is accompanied by the formation of unequal local dipoles at the two interfaces due to different chemical bonding. This is illustrated in FIGS. 6A and 6B. On the top interface, shown in FIG. 6A, the Pt and Ti atoms lose charge, which is redistributed between the atoms, forming a Pt—Ti alloy. On the bottom interface, shown in FIG. 6B, where the Pt—O distance is the shortest, the Pt and 0 atoms lose charge, the Pt from $d_{z^2}$ orbitals, and the O from $p_z$ orbitals, while the Pt $d_{xz}$ and $d_{yz}$ orbitals gain charge. In FIGS. 6A and 6B, electron loss is indicated by solid lines while electron gain is indicated by dotted lines. Similar behavior is observed at the ferroelectric-electrode interfaces of AO-terminated capacitors. Without being bound by any particular theory of operation, it is believed that this inequivalent charge arrangement at the two ferroelectric-metal interfaces is consistent with the different interface polarizations noted earlier.

Figure 7:
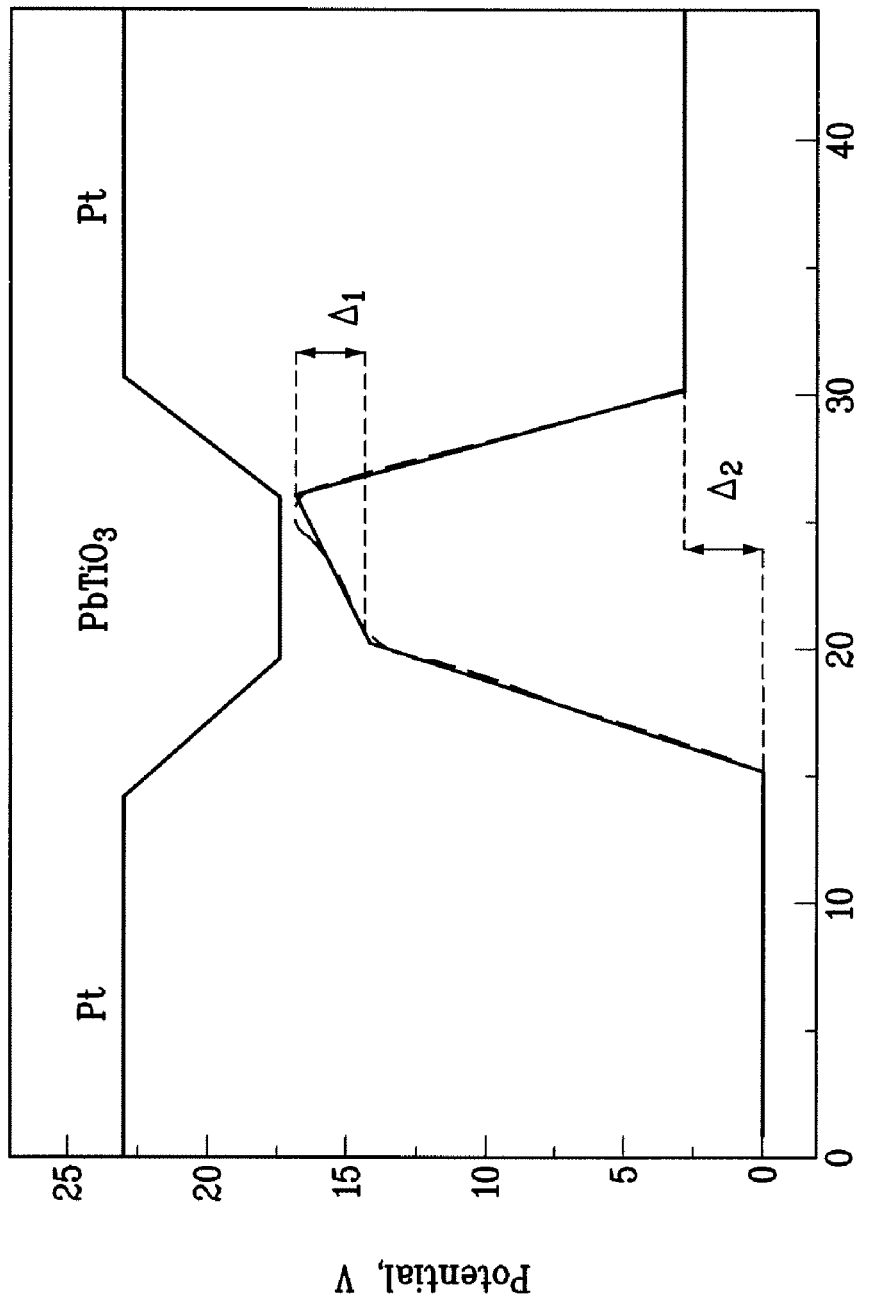
FIG. 7 is a plot of the electrostatic potential of a freestanding ferroelectric thin film.

FIG. 7 plots the electrostatic potential of a freestanding ferroelectric thin film with a fixed bulk ferroelectric displacement (lower curve) and the self-consistent potential from solving the Poisson equation for the Thomas-Fermi screening charges in the vicinity of the ferroelectric thin film (upper curve). FIG. 7 represents plots for $PbTiO_3$. The electrostatic potential in the freestanding film with a fixed bulk ferroelectric displacement shows that the potential drop across the ferroelectric slab ($\Delta 1$) is different from the potential difference between the two asymptotic vacuum potentials ($\Delta 2$). Without being bound by any particular theory of operation, it is believed that this difference arises because the two surfaces have different work functions, as a result of the polarization orientation, parallel to the top surface normal and antiparallel to the bottom one. Because Pauli repulsion keeps metal electrons out of the ferroelectric, the potential drop that is "seen" and screened by the electrodes is ($\Delta 2$), not ($\Delta 1$). An electrostatic analysis of the potential and the electric field in the slabs shows that this difference can affect the performance of ferroelectric thin film structures.

ADDITIONAL DESCRIPTION OF ILLUSTRATIVE EMBODIMENTS

Design of Additional Embodiments of Ultrathin Ferroelectric Films with Metal Electrodes Polarization stability in ferroelectric thin films. The stability of nanoscale ferroelectrics is governed by the extent to which the polarization charge at the surface can be compensated: Uncompensated surface charge leads to a depolarizing field which suppresses the polarization with decreasing size. Ultrathin ferroelectric films can be passivated by applying metal electrodes to both surfaces, thereby creating a capacitor geometry which is particularly useful in terms of applications. A voltage can be applied across the electrodes to switch the polarization of the thin film. The effectiveness of this approach, however, is dependent on the choice of both the ferroelectric and electrode materials.

Up until now, previous models of ferroelectric stability in ultrathin films were unable to provide a consistent picture of ferroelectric charge passivation that could describe the available experimental and theoretical results. Consequently, there was no reliable predictor for whether a given metal/ferroelectric/metal system would remain ferroelectric when decreased to nanoscale dimensions. Based on first-principles density functional theory calculations, the present invention is able to identify the parameters that are most important in governing the charge compensation, and thus the ferroelectric stability, of ultrathin films. Accordingly, an electrostatic model that accurately describes the behavior of such systems is provided herein.

We find that the ferroelectric stability is primarily determined by four characteristics of the metal/ferroelectric/metal system:

1. The amount of charge, $q_{trans}$, transferred between the ferroelectric and the metal at each interface.

The amount of charge transferred between the ferroelectric and the metal depends on a) the initial difference in the Fermi levels of the metal and the ferroelectric, $\Delta E_F$, and b) the presence of electronic states at the Fermi level of the ferroelectric. The initial Fermi level offset is the difference in the electrostatic potential of the bulk metal and the bulk ferroelectric, and can therefore be computed or obtained experimentally. In addition, the polarization in any ferroelectric insulator or semiconductor will shift the distribution of electronic states such that the valence band at the negatively poled surface, $P^-$, and the conduction band at the positively poled surface, $P^+$, cross the Fermi level, due to the repulsion (attraction) of the electronic states and the negative (positive) bound polarization charge at the $P^-$ ($P^+$) surfaces. Therefore, there will be at least a small number of states at the Fermi level at both surfaces.

2 and 3. The screening lengths of the bottom and the top electrodes.

These are well known for almost any choice of metal or semiconductor electrodes.

4. The amount of charge, $q_{sc}$, redistributed within the ferroelectric in the vicinity of each interface.

The presence of a polarization gradient, as opposed to a homogeneous polarization, in the ferroelectric film will result in the effective redistribution of charge throughout the film, instead of just at the surfaces. The polarization gradient, and therefore $q_{sc}$, can be determined via a Landau theory analysis such as that described in Bratkovsky and Levanyuk (BL).

Figure 8:
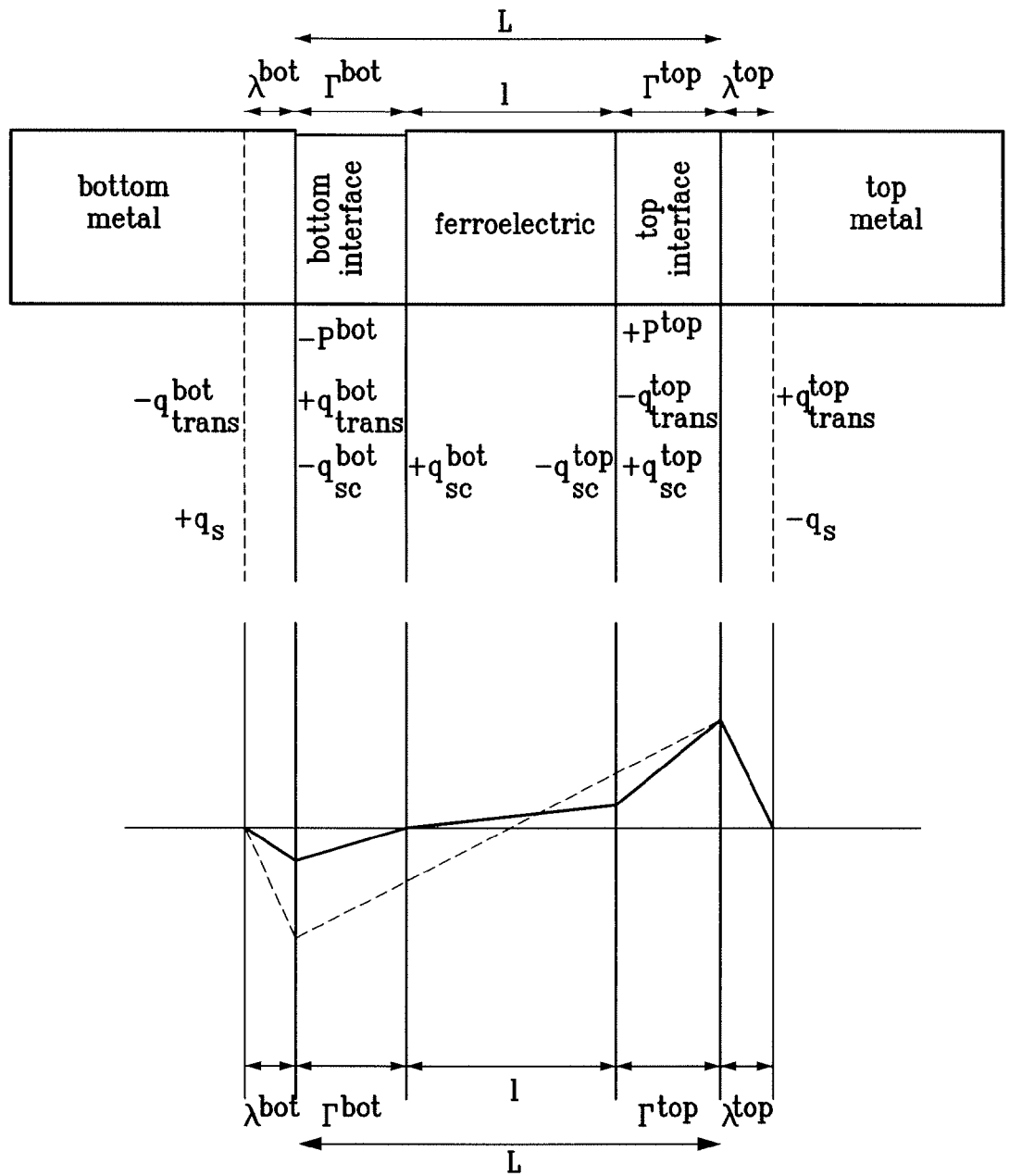
FIG. 8 illustrates the charge distribution in a metal/ferroelectric/metal film based on these four characteristics.

FIG. 8 illustrates the charge distribution in a metal/ferroelectric/metal film based on these four characteristics. To determine the resulting depolarizing field and the stable polarization, the value of the metal screening charge, $q_s$ is determined. This can be done using the fact that the entire system is at equipotential; in other words, no field can be sustained in either electrode, so the potential drop across the entire system must be equal to zero. Applying such short-circuit boundary conditions, we arrive at the following relationship:

$$\Delta V = (q_s - q_{trans,bot})\lambda_{bot} + (q_s - P - q_{sc,bot})\Gamma_{bot} + (q_s - P)l + (q_s - P - q_{sc,top})\Gamma_{top} + (q_s - q_{trans,top})\lambda_{top} = 0, \quad (1)$$

where the variables are defined as shown in FIG. 8. Solving Eq. 1 for $q_s$ then gives:

$$q_s = (q_{trans,bot}\lambda_{bot} + q_{trans,top}\lambda_{top} + q_{sc,bot}\Gamma_{bot} + q_{sc,top}\Gamma_{top} + PL)/(L + \lambda_{bot} + \lambda_{top}), \quad (2)$$

where $L = l + \Gamma_{bot} + \Gamma_{top}$, is the total ferroelectric film thickness.

The metal/ferroelectric/metal system can be described by one of four possible cases:

1. $\Delta E_F$ is <0 at both top and bottom interfaces.
2. $\Delta E_F$ is >0 at both top and bottom interfaces.
3. $\Delta E_F$ is <0 at top interface and >0 and bottom interface.
4. $\Delta E_F$ is >0 at top interface and <0 and bottom interface.

The expression for $q_s$, and thus for $E_{dpol}$, can be simplified for each of these cases. In case 1, $q_{trans,top}$ must equal zero, because there are no filled states at the Fermi level in the ferroelectric at the top surface from which charge can be transferred into the metal. In addition, at the bottom surface, the contribution from $q_{trans,bot}$ will always significantly outweigh that from $q_{sc,bot}$, since compensation of much of the polarization charge via direct charge transfer is possible. Therefore, Eq. 2 is reduced to:

$$q_s(\text{case 1})(q_{trans,bot}\lambda_{bot} + q_{sc,top}\Gamma_{top} + PL)/(L + \lambda_{bot} + \lambda_{top}) \quad (3)$$

Similar arguments can be used to reduce Eq. 2 in the other three cases, giving:

$$q_s(\text{case 2}) = (q_{trans,top}\lambda_{top} + q_{sc,bot}\Gamma_{bot} + q_{sc,top}\Gamma_{top} + PL)/(L + \lambda_{bot} + \lambda_{top}) \quad (4)$$

$$q_s(\text{case 3}) = (q_{trans,bot}\lambda_{bot} + q_{trans,top}\lambda_{top} + q_{sc,top}\Gamma_{top} + PL)/(L + \lambda_{bot} + \lambda_{top}) \quad (5)$$

$$q_s(\text{case 4}) = (q_{sc,bot}\Gamma_{bot} + q_{sc,top}\Gamma_{top} + PL)/(L + \lambda_{bot} + \lambda_{top}) \quad (6)$$

In cases 2 and 3, both the charge transfer between the ferroelectric and electrode at the top (bottom) surfaces are included, because in charge transfer into the conduction band is significantly limited by the density of states in the conduction band.

Expression for the depolarizing field. In general, the depolarizing field may be written as $$E_{depol}(Z) = (q_s - P(z))/\Gamma_{FE}, \quad (7)$$

where $\in_{FE}$ is the dielectric constant of the ferroelectric, and the position dependence of the polarization and the depolarizing field are both explicitly indicated. Using Eq. 2, this becomes $$E_{depol}(Z) = -(1 - L/(L + \lambda_{bot} + \lambda_{top}))P(Z)/\in_{FE} + (1/\in_{FE})(q_{trans,bot}\lambda_{bot} + q_{trans,top}\lambda_{top})/(L + \lambda_{bot} + \lambda_{top}) + (1/\in_{FE})(q_{sc,bot}\Gamma_{bot} + q_{sc,top}\Gamma_{top})/(L + \lambda_{bot} + \lambda_{top}). \quad (8)$$

The above equation shows that the magnitude of the depolarizing field depends on three terms. The first term is the same result as the standard screening model, giving the dependence of the depolarizing field on the polarization and the film thickness. Our model modifies this with two additional terms relating to the charge transferred across the metal/ferroelectric interfaces and the possibility for a polarization gradient. Equation 8 demonstrates that is possible to completely remove, or at least dramatically limit, the magnitude of the depolarizing field by choosing metal and ferroelectric materials that allow for favorable charge transfer and polarization gradients.

Determining $P(z)$ and $E_{depol}(Z)$ using BL. First, we want to find the minimum energy polarization and depolarizing fields for a given system. To do this, we start by writing the free energy of the ferroelectric film as:

$$G_{film} = \frac{1}{2}A(T - T_C)P(z)^2 + \frac{1}{4}BP(z)^4 + \frac{1}{6}CP(Z)^6 + \frac{1}{2}g(\delta P/\delta z)^2 + E_{depol}(Z)P(z), \quad (9)$$

where A, B and C are the usual Landau-Devonshire parameters, $T_C$ is the Curie temperature of bulk $BaTiO_3$ or $PbTiO_3$, and g measures the free energy cost of P inhomogeneity in the film.

We recast Eq. 8 into a finite difference form, so that $$G_{film} = \Sigma_i \frac{1}{2}A(T - T_C)P_i^2 + \frac{1}{4}BP_i^4 + \frac{1}{6}CP_i^6 + \frac{1}{2}g(P_i + P_{i+1})^2 + E_{depol,i}P_i, \quad (10)$$

where $P_i$ is the polarization of the ith unit cell, and i runs from 1 to n−1, where n denotes the layer of the ferroelectric. We set T=0 K and solve Eq. 10 by differentiating $G_{film}$ with respect to $P_2, P_3 \ldots P_{n-1}$ and solving numerically for $P_2, P_3 \ldots P_{n-1}$ such that $\delta G/\delta P_2, \delta G/\delta P_3 \ldots \delta G/\delta P_{n-1}$ are equal to 0.

We can then solve for the minimum energy $P_i$ and $E_{depol,i}$ by setting $P_1 = P_{bot}$ and $P_n = P_{top}$, where $P_{bot}$ and $P_{top}$ are characteristic of the given metal/ferroelectric interface, obtaining:

$$P_{i+1} = (1/g)\{(g - AT_C - (2/\in_{EF})(1 - L/(L + \lambda_{bot} + \lambda_{top})))P_i + BP_i^3 + CP_i^5 + \alpha/(L + \lambda_{bot} + \lambda_{top})\}, \quad (11)$$

where $$\alpha + (q_{trans,bot}\lambda_{bot} + q_{trans,top}\lambda_{top} + q_{sc,bot}\Gamma_{bot} + q_{sc,top}\Gamma_{top})/\in_{FE}. \quad (12)$$

General design rules for stable ultrathin film ferroelectric structures. From the above analysis, we can extract general design principles for maximizing the stability of ultrathin ferroelectric films. These are enumerated as follows:

1. Using an oxide with a large bulk polarization, $P_{bulk}$, increases stability.
2. Using metal electrodes with a short screening length, λ, increases stability.
3. a) Electron transfer from the oxide to the metal at the $P^-$ interface increases stability.
   b) Electron transfer from the oxide to the metal at the $P^+$ interface decreases stability.
   This situation will occur when one selects electrode materials such that the Fermi level of the metal is lower than that of the oxide at both the $P^-$ and the $P^+$ interfaces.
4. a) Electron transfer from the metal to the oxide on the $P^-$ interface decreases stability.
   b) Electron transfer from the metal to the oxide on the $P^+$ interface increases stability.
   This situation will occur when one selects electrode materials such that the Fermi level of the metal is higher than that of the oxide at both the $P^-$ and the $P^+\alpha$ interfaces.
5. a) Oxide polarization greater than $P_{bulk}$ near the $P^+$ interface increases stability.
   b) Oxide polarization less than $P_{bulk}$ near the $P^+$ interface decreases stability.
   c) Oxide polarization greater than $P_{bulk}$ near the $P^-$ interface decreases stability.
   d) Oxide polarization less than $P_{bulk}$ near the $P^-$ interface increases stability.

Inhomogeneous polarization of the film can be achieved through the use of bulk oxides with a low energy cost associated with polarization gradients, or through the use of oxide composites with different bulk polarization values.

6. Combining rules 3, 4 and 5:
   a) Simultaneous selection of a metal whose Fermi level is lower than the oxide Fermi level at the $P^-$ interface but not at the $P^+$ interface and the selection of an oxide composite such that the oxide polarization is greater than $P_{bulk}$ near the $P^+$ interface leads to greater stability.
   b) Simultaneous selection of a metal whose Fermi level is lower than the oxide Fermi level at the $P^-$ interface but not at the $P^+$ interface and the selection of an oxide composite such that the oxide polarization is less than $P_{bulk}$ near the $P^-$ interface leads to greater stability.
   c) Simultaneous selection of a metal whose Fermi level is higher than the oxide Fermi level at the $P^+$ interface but not at the $P^-$ interface and the selection of an oxide composite such that the oxide polarization is greater than $P^{bulk}$ near the $P^+$ interface leads to greater stability.
   d) Simultaneous selection of a metal whose Fermi level is higher than the oxide Fermi level at the $P^+$ interface but not at the $P^-$ interface and the selection of an oxide composite such that the oxide polarization is less than $P_{bulk}$ near the $P^-$ interface leads to greater stability.

Specific examples of stable ultrathin film ferroelectric structures consistent with the above-listed design rules. In regard to design rule 1, using an oxide with a large bulk polarization, $P_{bulk}$, increases stability, the following materials are suitable: PT ($PT = PbTiO_3$) has large P and is a prototype; any of the many alloys of PT, with $PZT = Pb(Zr_{1-x}Ti_x)O_3$ being particularly suitable; next generation materials with large bulk P (greater than that of PT), such as $BZT = Bi(Zn_{0.5}Ti_{0.5})O_3$; alloys of Bi-based $ABO_3$ oxides with PT, such as those described in "Nonmonotonic TC Trends in Bi-Based Ferroelectric Perovskite Solid Solutions," Ilya Grinberg and Andrew M. Rappe, *Phys. Rev. Lett.* 98, 037603 (2007), and "Structure and Polarization in the High Tc Ferroelectric $Bi(Zn_{0.5},Ti_{0.5})O_3$—$PbTiO_3$ Solid Solutions," Ilya Grinberg, et al., *Phys. Rev. Lett.* 98, 107601 (2007), the entirety of each publication pertaining to alloys of Bi-based $ABO_3$ oxides with PT is incorporated by reference herein; the alloy is BZT-PT=$[Bi(Zn_{0.5} Ti_{0.5})O_3]_x [PbTiO_3]_{\{1-x\}}$. In addition, applying in-plane compressive strain generally increases P as well. This can be used to some extent to increase the polarization of $BaTiO_3$, for example, and can be important in making Pb-free materials.

In regard to design rule 2, using short screening length metals, the following materials are suitable: Pt and Al. Most of the other transition metals have short screening lengths, as well, offering a range of in-plane lattice constants to match up with different ferroelectric materials for epitaxial growth and different in-plane strains. It should also be noted that epitaxial match-up of the metal electrodes, interfaces and the ferroelectric thin film does not necessarily require the corresponding layers to be epitaxial.

In regard to design rule 3, using electron transfer from oxide to metal on P− end only, the following materials are suitable: Pt/BT/Pt and Pt/PT/Pt, which exhibits this effect based on the calculations of the Pt/PT/Pt system provided herein.

In regard to design rule 4, using electron transfer from metal to oxide on $P^+$ end only, the following materials are suitable: a more electropositive metal to show this behavior when paired with PT, such as possibly K/PT (potassium on >PbTiO3); our DFT calculations show that Al/PT/Al has this behavior.

In regard to design rule 5, using a material with $P>P_{bulk}$ near the surface on the $P^+$ side, the following materials are suitable: in some metal/oxide/metal combinations this happens spontaneously, e.g., Pt/PT/Pt as reported hereinabove; Pt/PT/BT/PT/Pt (without being bound to any particular theory of operation, having PT at the oxide surface will enhance $P>P_{bulk}$ at the $P^+$ interface, reduces the depolarizing field. The enhanced $P>P_{bulk}$ at the $P^-$ surface doesn't matter in our opinion because the electronic transfer from PT to Pt at the P− surface passivates that surface. In addition, $SR/TiO_2/PT/TiO_2/SR$ is an example of a system with both $P>P_{bulk}$ at $P^+$ and $P<P_{bulk}$ at $P^-$. In this case, there is very little charge transfer at either end because the $SrO/TiO_2$ interface acts like a small insulating barrier, but the polarization gradient, along with the metallic screening in the SR on the opposite side of this barrier, is able to stabilize the ferroelectric state.

In regard to design rule 6, it is not necessary to have the same electrode material at both interfaces. For example, one way to increase BT stability while still retaining switchability in a single system is to use one Pt electrode and one SR electrode. When the Pt electrode is at the P− interface (Pt/BaO/BT/BaO/SR), the average polarization is larger than the bulk BT polarization. When the Pt electrode is at the P+ interface (i.e., when the polarization direction is switched), the system has another stable ferroelectric state, with a smaller polarization.

In regard to crystal orientations of the compositions described herein, the absence of interface trap states and high interface quality are important to creating thin film dielectric materials. Pt(100) on PT (due to lattice matching) is a manifestation of this positive idea. Accordingly, epitaxy in the systems is not a requirement to achieve stable thin film ferroelectric structures. In certain embodiments, interface defects, trap states, or both, could contribute to charge compensation, but just as many in which they could destabilize ferroelectricity. Accordingly, while epitaxy is not necessarily required, it provides more control over the composition of the metal—ferroelectric interfaces. With being bound by any particular theory of operation, this phenomenon is independent of ferroelectric film thickness; however, their relative effects on polarization stability will decrease as film thickness increases. The DFT examples described herein are for films of thickness in the range of from about 8 Angstroms to about 12 Angstroms, which corresponds to about 3 units cells of the ferroelectric material. Even thinner film thicknesses are possible, such as 2 or even 1 unit cell, which can correspond to thin film thicknesses on the order of at least about 1 Angstrom, or even at least about 2 Angstroms, or even at least about 3 Angstroms, or even at least about 4 Angstroms, or even at least about 5 Angstroms, or even at least about 6 Angstroms, or even at least about 7 Angstroms. Larger film thicknesses, of up to about 13 Angstroms, of up to about 14 Angstroms, of up to about 15 Angstroms, of up to about 16 Angstroms, of up to about 17 Angstroms, of up to about 18 Angstroms, of up to about 19 Angstroms, of up to about 20 Angstroms, of up to about 21 Angstroms, of up to about 22 Angstroms, or even up to about 23 Angstroms, are also possible. This can correspond to 4 or more unit cells of the ferroelectric material, such as up to 5, or even 6, or even 7, or even 8, or even 9 or more unit cells. Accordingly, applying these design rules enable the manufacture of thin film dielectric systems without a critical thickness.

DFT results for ultrathin metal/ferroelectric/metal capacitors. To test the application of these general design rules, we performed DFT calculations using ultrasoft pseudopotentials and the generalized gradient approximation (GGA), as implemented in the ab initio code dacapo (http://dcwww.camp.d-tu.dk/campos/Dacapo/), with a plane wave cutoff of 30 Ry and a 4×4×1 Monkhorst-Pack k-point mesh. We considered both the AO and $TiO_2$ terminations of 7-layer-thick $BaTiO_3$ and $PbTiO_3$ (001) films sandwiched between two electrodes. To investigate the effects of the interfacial layers and the metal identity, four types of systems were investigated, as shown in Table II: symmetric films with symmetric electrodes; symmetric films with asymmetric electrodes; symmetric films with surface layer substitutions; and asymmetric films with surface layer substitutions. Here, "(a) symmetric films" and "(a) symmetric electrodes" refer to the identity of the ferroelectric $P^-$ and $P^+$ surface layers and the electrode materials, respectively, not to the structural symmetry of the film; all films were initially bulk polarized, then allowed to relax completely until the forces on each atom were less than 0.01 eV/Å.

The in-plane lattice constant was fixed to the theoretical bulk $PbTiO_3$ value of 3.86 Å for all films for consistency in comparison of mixed layer films. Therefore, the $BaTiO_3$ films are under a compressive strain of 3%; in agreement with theory and experiment, they are therefore ferroelectric, unlike those considered under strain-free conditions. We also examined a number of films at the theoretical $BaTiO_3$ and $SrTiO_3$ in-plane lattice constants, a=3.99 and a=3.94, respectively. Qualitatively, the results show similar trends, but with polarization values decreasing with increasing lattice constant.

The computed polarization values of a variety of capacitor structures are shown in II. The total energies of each structure were compared to those of the corresponding paraelectric structure to confirm the stability of the ferroelectric state. In the asymmetric systems, the middle five ferroelectric layers were fixed in their centrosymmetric positions to compute the total energy of the paraelectric state. In the cases where a polarization magnitude is given, the ferroelectric well-depth was determined to be negative (i.e., the ferroelectric state was more stable than the paraelectric state). Systems listed as "not stable" were found to have a small barrier between a local ferroelectric minimum the lower energy paraelectric ground state.

TABLE II

Computed polarization values for some metal/FE/metal capacitors. Polarization is estimated as the average layer-to-bulk ratio of the rumpling parameters. The bulk rumpling parameters correspond to those of the material in the central region.

| Bottom Electrode | Bottom FE layer | Central Region | Top FE Layer | Top Electrode | $P/P_{bulk}$ |
|---|---|---|---|---|---|
| Symmetric films: | | | | | |
| Pt | PbO | PbTiO$_3$ | PbO | Pt | 0.89 |
| Pt | TiO$_2$ | PbTiO$_3$ | TiO$_2$ | Pt | 0.98 |
| Pt | BaO | BaTiO$_3$ | BaO | Pt | 0.75 |
| Pt | TiO$_2$ | BaTiO$_3$ | TiO$_2$ | Pt | 1.34 |
| SrRuO$_3$ | PbO | PbTiO$_3$ | PbO | SrRuO$_3$ | 0.95 |
| SrRuO$_3$ | TiO$_2$ | PbTiO$_3$ | TiO$_2$ | SrRuO$_3$ | 0.33 |
| SrRuO$_3$ | BaO | BaTiO$_3$ | BaO | SrRuO$_3$ | 0.63 |
| SrRuO$_3$ | TiO$_2$ | BaTiO$_3$ | TiO$_2$ | SrRuO$_3$ | 0.44 |
| Al | PbO | PbTiO$_3$ | PbO | Al | 1.03 |
| Al | TiO$_2$ | PbTiO$_3$ | TiO$_2$ | Al | 1.03 |
| Al | BaO | BaTiO$_3$ | BaO | Al | not stable |
| Al | TiO$_2$ | BaTiO$_3$ | TiO$_2$ | Al | not stable |
| Substituted surfaces: | | | | | |
| Pt | BaO | PbTiO$_3$ | BaO | Pt | 0.63 |
| Pt | PbO | BaTiO$_3$ | PbO | Pt | 0.91 |
| SrRuO$_3$ | BaO | PbTiO$_3$ | BaO | SrRuO$_3$ | 0.82 |
| SrRuO$_3$ | PbO | BaTiO$_3$ | PbO | SrRuO$_3$ | 1.61 |
| Asymmetric electrodes: | | | | | |
| Al | PbO | PbTiO$_3$ | PbO | SrRuO$_3$ | 0.98 |
| SrRuO$_3$ | PbO | PbTiO$_3$ | PbO | Al | not stable |
| Pt | BaO | BaTiO$_3$ | PbO | Al | 1.51 |
| Al | BaO | BaTiO$_3$ | PbO | Pt | 0.13 |
| Pt | TiO$_2$ | BaTiO$_3$ | BaO | SrRuO$_3$ | 0.52 |
| SrRuO$_3$ | TiO$_2$ | BaTiO$_3$ | BaO | Pt | flips |
| Asymmetric surfaces: | | | | | |
| Pt | BaO | PbTiO$_3$ | PbO | Pt | 0.89 |
| Pt | PbO | PbTiO$_3$ | BaO | Pt | 0.58 |
| Pt | BaO | BaTiO$_3$ | PbO | Pt | 1.10 |
| Pt | PbO | BaTiO$_3$ | BaO | Pt | 0.66 |
| Pt | TiO$_2$ | PbTiO$_3$ | PbO | Pt | 0.75 |
| Pt | PbO | PbTiO$_3$ | TiO$_2$ | Pt | 0.94 |

Qualitative trends. The polarization values in Table II clearly illustrate that the composition of the interface plays a huge role in determining ferroelectric stability. We can draw a number of conclusions about the nature of the metal/ferroelectric interface from the data in this table. First, we see that the screening length does not play the main role in determining ferroelectric stability. Most strikingly, Al and Pt electrodes produce dramatically different behavior, even though they have the same, very small screening length (~0.5 Å). For example, Pt stabilizes a large polarization in BaTiO$_3$ films with both BaO and TiO$_2$ terminations, while Al electrodes do not stabilize any polarization at all in the same films. Furthermore, SrRuO$_3$, which has a much larger screening length (~4 Å) than Pt or Al, also stabilizes a ferroelectric state in both BaTiO$_3$ films.

We also see that there is a significant difference between the polarization of AO- and TiO$_2$-terminated films of the same material. This effect is most pronounced with SrRuO$_3$ electrodes. For example, the PbO-terminated SrRuO$_3$/PbTiO$_3$/SrRuO$_3$ film exhibits almost full bulk polarization, while the analogous TiO$_2$-terminated film has a much smaller polarization, about ⅓ of the bulk value. This demonstrates that at the nanoscale, where the ratio of surface to bulk-like regions is large, we cannot describe the ferroelectric (or metallic oxide electrodes) based solely on their bulk properties, which would suggest the same interaction for both terminations.

Another observation that becomes clear from Table II is that the surface ferroelectric layers are much more important than the central layers in governing the stability. While the "bulk" region of the film approximately determines the maximum of the polarization (i.e., the BaTiO$_3$ films with the largest polarizations are around $P_{BaTiO3,bulk}$, etc.), it is the surface layers that determine the amount of the bulk polarization that can be stabilized. This makes sense, as, for example, it becomes very unfavorable for BaTiO$_3$ to have a polarization much larger than its bulk value; therefore, even if the presence of a PbO surface layer could possibly screen more than the polarization charge, there is no incentive for it to do so.

Table II also shows that the behavior of a given surface layer is very different at the negatively and positively poled interfaces. We find, for instance, that a PbO layer at the P$^+$ surface is not necessarily as good at screening as a PbO layer at the P$^-$ surface, even in combination with same electrode. Substituting both BaO surface layers in a Pt/BaTiO$_3$/Pt film with PbO increases the polarization from 75 to 91% of the bulk BaTiO$_3$ value. Substituting just the bottom BaO layer, however, results in a polarization of 66% of the bulk BaTiO$_3$, not even as effective as two BaO surfaces. On the other hand, substituting PbO for the top BaO layer increases the polarization to 110% of the bulk value. The same principle is true for TiO$_2$ and BaO surface layers: the interaction of a given ferroelectric layer with a given metal at P$^+$ cannot be described as "the same, but in the opposite direction" as that at P$^-$.

Finally, we see that the asymmetry introduced by having two different electrodes is not sufficient to cause ferroelectricity in and of itself. In some cases, one direction is favored over the other, with a larger polarization, indicating an asymmetric double well potential. At the extreme of this case, we find in the TiO$_2$-terminated BaTiO$_3$ system with one Pt and one SrRuO$_3$ electrode that there is only a single stable polarized state; whether it is initially pointing towards the Pt or the SrRuO$_3$ electrode, the polarization flips such that the Pt electrode is always at the P$^-$ interface.

TABLE III

Initial Fermi level offsets (in eV) for some ferroelectric/metal combinations. The metal screening lengths are also given, in Å.

| Ferroelectric | Metal | $\Delta E_F$ | $\lambda$ |
|---|---|---|---|
| PbTiO$_3$ | Pt | −0.80 | 0.5 |
| PbTiO$_3$ | Al | 0.91 | 0.5 |
| PbTiO$_3$ | SrRuO$_3$ | −0.19 | 4.0 |
| BaTiO$_3$ | Pt | −1.20 | 0.5 |
| BaTiO$_3$ | Al | 1.01 | 0.5 |
| BaTiO$_3$ | SrRuO$_3$ | −0.34 | 4.0 |

Discovery of the source of the problem with respect to various aspects of the instant invention: It is well-known that ferroelectric materials experience a potential drop (=voltage drop) across them. This voltage drop is directly proportional to the material polarization and the electrode screening length, and inversely proportional to ferroelectric film thickness (making it a bigger problem for thinner films). This is referred to as a "depolarizing field". It is intrinsic to all ferroelectrics.

It is also well known that electrodes remove much but not all of this voltage drop. In principle, if a metal with screening length=0 were found, it could perfectly passivate the voltage drop, but no such metal exists.

The "depolarizing field" is directed oppositely to the polarization and tends to inhibit or remove polarization. Therefore, below a certain thickness, ferroelectricity is not stable.

It is therefore widely concluded by others of skill in the art, prior to this invention, that films below a certain thickness cannot support stable ferroelectricity along the surface normal direction.

Accordingly, a conceptual solution giving rise to the various aspects of the claimed invention as disclosed herein is as follows: If local dipoles oriented parallel to the polarization are introduced into the system near one or both faces of the ferroelectric, this can reduce (below the value of the prevailing wisdom) or completely eliminate the depolarizing field.

The reason why this solution works is as follows: the electrode screening is based on the total potential drop between one electrode and the other. In the proposed conceptual solution, the electrodes screen the local dipole at one end, the polarization of the ferroelectric film, and the local dipole at the other end. This provides greater screening than just screening the ferroelectric only, and reduces or eliminates the depolarization field and the potential drop in the ferroelectric. This enables robust ferroelectricity in ultrathin (approximately on the order of magnitude of 1 nm) films.

One embodiment of a tangible material geometry to implement this solution is as follows:

Pt/BZT-PT/PT/BZT-PT/Pt

Suppose the film is polarized so that the positively charged oxide face is to the right:

Pt/BZT-PT/PT/BZT-PT/Pt

P− end P+ end

This film will exhibit two mechanisms for creating local dipoles that are parallel to the polarization, enhancing electrode screening and stabilizing ferroelectricity in ultrathin films.

1. At the P− end, electrons move from BZT-PT to Pt. This is because the fermi energy of Pt is below that of P− BZT-PT. Moving negative charge to the left makes a dipole parallel to the polarization dipole.

2. At the P+ end, the BZT-PT layer will have P>P_bulk. This will increase the positive charge at the P+ end (the BZT-PT/Pt interface) and create some negative charge at the PT/BZT-PT interface. This new dipole is also parallel to the polarization dipole.

The electron transfer mechanism (1) and the polarization gradient mechanism (2) are specific material solutions creating local surface dipoles parallel to the polarization dipole, enhancing screening of electrodes and enabling stable ferroelectric polarization in thinner films than without this conceptual solution to the "Depolarizing field" problem.

Although several illustrative embodiments of the invention have been described herein, it should be understood that various modifications to the materials, structures, and methods will be apparent to those of skill in the art, and are within the spirit and scope of the invention.

What is claimed is:

1. A ferroelectric structure, comprising:
a first electrode comprising a first layer having a periodic atomic arrangement;
a ferroelectric thin film comprising a first termination and a second termination; and
a second electrode comprising a second layer having a periodic atomic arrangement,
wherein at least a portion of the first layer of the first electrode is in epitaxial contact with at least a portion of the first termination of the ferroelectric thin film;
wherein the first termination of the ferroelectric thin film has a periodic atomic arrangement that approximately matches the periodic atomic arrangement of the first layer of the first electrode
wherein at least a portion of the second layer of the second electrode is in contact with at least a portion of the second termination of the ferroelectric thin film;
wherein the second termination of the ferroelectric thin film has a periodic atomic arrangement that approximately matches the periodic atomic arrangement of the second layer of the second electrode, and
wherein the first electrode and the second electrode comprise platinum.

2. A ferroelectric structure, comprising:
a first electrode comprising a first layer having a periodic atomic arrangement;
a ferroelectric thin film comprising a first termination and a second termination; and
a second electrode comprising a second layer having a periodic atomic arrangement,
wherein at least a portion of the first layer of the first electrode is in epitaxial contact with at least a portion of the first termination of the ferroelectric thin film;
wherein the first termination of the ferroelectric thin film has a periodic atomic arrangement that approximately matches the periodic atomic arrangement of the first layer of the first electrode
wherein at least a portion of the second layer of the second electrode is in contact with at least a portion of the second termination of the ferroelectric thin film;
wherein the second termination of the ferroelectric thin film has a periodic atomic arrangement that approximately matches the periodic atomic arrangement of the second layer of the second electrode,
wherein the first electrode and second electrode comprise a metal or a metal alloy, and
wherein the ferroelectric thin film further comprises a repeated pattern of layers of PbO and TiO2.

3. A ferroelectric structure, comprising:
a first electrode comprising a first layer having a periodic atomic arrangement;
a ferroelectric thin film comprising a first termination and a second termination; and
a second electrode comprising a second layer having a periodic atomic arrangement,
wherein at least a portion of the first layer of the first electrode is in epitaxial contact with at least a portion of the first termination of the ferroelectric thin film;
wherein the first termination of the ferroelectric thin film has a periodic atomic arrangement that approximately matches the periodic atomic arrangement of the first layer of the first electrode
wherein at least a portion of the second layer of the second electrode is in contact with at least a portion of the second termination of the ferroelectric thin film;
wherein the second termination of the ferroelectric thin film has a periodic atomic arrangement that approximately matches the periodic atomic arrangement of the second layer of the second electrode,
wherein the first electrode and second electrode comprise a metal or a metal alloy, and
wherein the first termination comprises PbO.

4. The ferroelectric structure of claim 3, wherein the second termination comprises PbO.

5. A ferroelectric structure, comprising:
a first electrode comprising a first layer having a periodic atomic arrangement;
a ferroelectric thin film comprising a first termination and a second termination; and
a second electrode comprising a second layer having a periodic atomic arrangement,
wherein at least a portion of the first layer of the first electrode is in epitaxial contact with at least a portion of the first termination of the ferroelectric thin film;
wherein the first termination of the ferroelectric thin film has a periodic atomic arrangement that approximately matches the periodic atomic arrangement of the first layer of the first electrode
wherein at least a portion of the second layer of the second electrode is in contact with at least a portion of the second termination of the ferroelectric thin film;
wherein the second termination of the ferroelectric thin film has a periodic atomic arrangement that approximately matches the periodic atomic arrangement of the first layer of the second electrode,
wherein the first electrode and second electrode comprise metal or a metal alloy, and
wherein the first termination comprises TiO2.

6. The ferroelectric structure of claim 5, wherein the second termination comprises $TiO_2$.

7. A ferroelectric structure, comprising:
a first electrode comprising a first layer having a periodic atomic arrangement;
a ferroelectric thin film comprising a first termination and a second termination; and
a second electrode comprising a second layer having a periodic atomic arrangement,
wherein at least a portion of the first layer of the first electrode is in epitaxial contact with at least a portion of the first termination of the ferroelectric thin film;
wherein the first termination of the ferroelectric thin film has a periodic atomic arrangement that approximately matches the periodic atomic arrangement of the first layer of the first electrode
wherein at least a portion of the second layer of the second electrode is in contact with at least a portion of the second termination of the ferroelectric thin film;
wherein the second termination of the ferroelectric thin film has a periodic atomic arrangement that approximately matches the periodic atomic arrangement of the first layer of the second electrode,
wherein the first electrode and second electrode comprise metal or a metal alloy, and
wherein the first and second terminations of the ferroelectric thin film have a (100) crystallographic orientation.

8. The ferroelectric structure of claim 7, wherein the first electrode has a (100) crystallographic orientation.

9. The ferroelectric structure of claim 8, wherein the second electrode has a (100) crystallographic structure.

10. A ferroelectric structure, comprising:
a first electrode comprising a first surface, the first surface having a periodic arrangement of atoms of the first electrode;
a ferroelectric thin film comprising a first termination and a second termination; and
a second electrode comprising a second surface, the second surface having a periodic arrangement of atoms of the second electrode;
wherein the first termination is formed of a periodic arrangement of at least one type of atom of the ferroelectric thin film,
wherein at least a portion of the periodic arrangement of atoms of the first surface of the first electrode is in epitaxial contact with at least a portion of the periodic arrangement of atoms of the first termination of the ferroelectric thin film;
wherein the second termination is formed of a periodic arrangement of least one type of atom of the ferroelectric thin film;
wherein at least a portion of the periodic arrangement of atoms of the second surface of the second electrode is in epitaxial contact with at least a portion of the periodic arrangement of atoms of the second termination of the ferroelectric thin film, and
wherein the first electrode and the second electrode comprise platinum.

11. A ferroelectric structure, comprising:
a first electrode comprising a first surface, the first surface having a periodic arrangement of atoms of the first electrode;
a ferroelectric thin film comprising a first termination and a second termination;
a second electrode comprising a second surface, the second surface having a periodic arrangement of atoms of the second electrode;
wherein the first termination is formed of a periodic arrangement of at least one type of atom of the ferroelectric thin film;
wherein at least a portion of the periodic arrangement of atoms of the first surface of the first electrode is in epitaxial contact with at least a portion of the periodic arrangement of atoms of the first termination of the ferroelectric thin film;
wherein the second termination is formed of a periodic arrangement of the at least one type of atom of the ferroelectric thin film;
wherein at least a portion of the periodic arrangement of atoms of the second surface of the second electrode is in epitaxial contact with at least a portion of the periodic arrangement of atoms of the second termination of the ferroelectric thin film,
wherein the first electrode and second electrode comprise a metal or a metal alloy, and
wherein the ferroelectric thin film further comprises a repeated pattern of layers of PbO and TiO2.

12. A ferroelectric structure, comprising:
a first electrode comprising a first surface, the first surface having a periodic arrangement of atoms of the first electrode;
a ferroelectric thin film comprising a first termination and a second termination;
a second electrode comprising a second surface, the second surface having a periodic arrangement of atoms of the second electrode;
wherein the first termination is formed of a periodic arrangement of at least one type of atom of the ferroelectric thin film;
wherein at least a portion of the periodic arrangement of atoms of the first surface of the first electrode is in epitaxial contact with at least a portion of the periodic arrangement of atoms of the first termination of the ferroelectric thin film;
wherein the second termination is formed of a periodic arrangement of the at least one type of atom of the ferroelectric thin film;
wherein at least a portion of the periodic arrangement of atoms of the second surface of the second electrode is in epitaxial contact with at least a portion of the periodic arrangement of atoms of the second termination of the ferroelectric thin film, wherein the first electrode and second electrode comprise a metal or a metal alloy, and wherein the first termination comprises PbO.

13. The ferroelectric structure of claim 12, wherein the second termination comprises PbO.

14. A ferroelectric structure, comprising:

a first electrode comprising a first surface, the first surface having a periodic arrangement of atoms of the first electrode;

a ferroelectric thin film comprising a first termination and a second termination;

a second electrode comprising a second surface, the second surface having a periodic arrangement of atoms of the second electrode;

wherein the first termination is formed of a periodic arrangement of at least one type of atom of the ferroelectric thin film;

wherein at least a portion of the periodic arrangement of atoms of the first surface of the first electrode is in epitaxial contact with at least a portion of the periodic arrangement of atoms of the first termination of the ferroelectric thin film;

wherein the second termination is formed of a periodic arrangement of the at least one type of atom of the ferroelectric thin film;

wherein at least a portion of the periodic arrangement of atoms of the second surface of the second electrode is in epitaxial contact with at least a portion of the periodic arrangement of atoms of the second termination of the ferroelectric thin film, wherein the first electrode and second electrode comprise a metal or a metal alloy, and wherein the first termination comprises TiO2.

15. The ferroelectric structure of claim 14, wherein the second termination comprises $TiO_2$.

16. A ferroelectric structure, comprising:

a first electrode comprising a first surface, the first surface having a periodic arrangement of atoms of the first electrode;

a ferroelectric thin film comprising a first termination and a second termination;

a second electrode comprising a surface, the second surface having a periodic arrangement of atoms of the second electrode;

wherein the first termination is formed of a periodic arrangement of at least one type of atom of the ferroelectric thin film;

wherein at least a portion of the periodic arrangement of atoms of the first surface of the first electrode is in epitaxial contact with at least a portion of the periodic arrangement of atoms of the first termination of the ferroelectric thin film;

wherein the second termination is formed of a periodic arrangement of the at least one type of atom of the ferroelectric thin film;

wherein at least a portion of the periodic arrangement of atoms of the second surface of the second electrode is in epitaxial contact with at least a portion of the periodic arrangement of atoms of the second termination of the ferroelectric thin film, wherein the first electrode and second electrode comprise a metal or a metal alloy, and wherein the first and second terminations of the ferroelectric thin film have a (100) crystallographic orientation.

17. The ferroelectric structure of claim 16, wherein the first electrode has a (100) crystallographic orientation.

18. The ferroelectric structure of claim 17, wherein the second electrode has a (100) crystallographic structure.

19. A method of forming a ferroelectric structure, comprising:

forming a ferroelectric thin film comprising a first termination and a second termination, and wherein the first termination has a periodic arrangement of atoms of the ferroelectric thin film;

forming a first electrode comprising a first surface having a periodic arrangement of atoms of the first electrode:

wherein at least a portion of the periodic arrangement of atoms of the first surface of the first electrode is formed in epitaxial contact with at least a portion of the periodic arrangement of atoms of the first termination of the ferroelectric thin film forming a second electrode comprising a second surface having a periodic arrangement of atoms of the first electrode;

wherein the second termination has a periodic arrangement of atoms of the ferroelectric thin film;

wherein at least a portion of the periodic arrangement of atoms of the second surface of the second electrode is formed in epitaxial contact with at least a portion of the periodic arrangement of atoms of the second termination of the ferroelectric thin film; and forming the first electrode of platinum.

20. A method of forming a ferroelectric structure, comprising:

forming a ferroelectric thin film comprising a first termination and a second termination, and wherein the first termination has a periodic arrangement of atoms of the ferroelectric thin film;

forming a first electrode comprising a first surface having a periodic arrangement of atoms of the first electrode;

wherein at least a portion of the periodic arrangement of atoms of the first surface of the first electrode is formed in epitaxial contact with at least a portion of the periodic arrangement of atoms of the first termination of the ferroelectric thin film forming a second electrode comprising a second surface having a periodic arrangement of atoms of the first electrode;

wherein the second termination has a periodic arrangement of atoms of the ferroelectric thin film;

wherein at least a portion of the periodic arrangement of atoms of the second surface of the second electrode is formed in epitaxial contact with at least a portion of the periodic arrangement of atoms of the second termination of the ferroelectric thin film;

forming the first electrode of a metal or metal alloy; and forming the second electrode of platinum.

* * * * *